United States Patent

Otsuka

[19]

[11] Patent Number: 5,835,101
[45] Date of Patent: Nov. 10, 1998

[54] IMAGE INFORMATION PROCESSING APPARATUS HAVING MEANS FOR UNITING VIRTUAL SPACE AND REAL SPACE

[75] Inventor: Tatsushi Otsuka, Kawasaki, Japan

[73] Assignee: Fujitsu Limited, Kawasaki, Japan

[21] Appl. No.: 710,759

[22] Filed: Sep. 20, 1996

[30] Foreign Application Priority Data

Apr. 10, 1996 [JP] Japan ..................................... 8-088638

[51] Int. Cl.[6] .............................. G06F 15/00; G06T 1/00
[52] U.S. Cl. .......................... 345/501; 345/302; 345/430; 345/507; 345/518
[58] Field of Search ..................................... 345/418, 302, 345/419–432, 441, 473, 501, 503, 507, 508, 511, 512, 518, 203

[56] References Cited

U.S. PATENT DOCUMENTS

| | | | |
|---|---|---|---|
| 5,047,760 | 9/1991 | Trevett et al. | 345/508 |
| 5,450,549 | 9/1995 | Casparian | 345/509 |
| 5,561,745 | 10/1996 | Jackson et al. | 345/419 |
| 5,651,127 | 7/1997 | Gove et al. | 711/202 |
| 5,696,892 | 12/1997 | Redmann et al. | 345/425 |

FOREIGN PATENT DOCUMENTS

| | | |
|---|---|---|
| 7-093579 | 4/1995 | Japan. |
| 7-287775 | 10/1995 | Japan. |
| 22 56 568 | 12/1992 | United Kingdom. |

*Primary Examiner*—Matthew M. Kim
*Assistant Examiner*—U. Chauhan
*Attorney, Agent, or Firm*—Staas & Halsey

[57] ABSTRACT

An image information processing apparatus includes a cross bar switch circuit receiving first image information which indicates a two-dimensional image and second image information which indicates three-dimensional computer graphics describing a three-dimensional object by approximation using a plurality of polygons, an arbitration circuit controlling a connection of the cross bar switch circuit according to a predetermined rule based on a synchronizing signal which is related to the first image information, and a memory unit having a first memory region and a second memory region which is different from the first memory region. The memory unit is capable of reading information from the second memory region during a time in which image information output from the cross bar switch circuit is written in the first memory region.

15 Claims, 19 Drawing Sheets

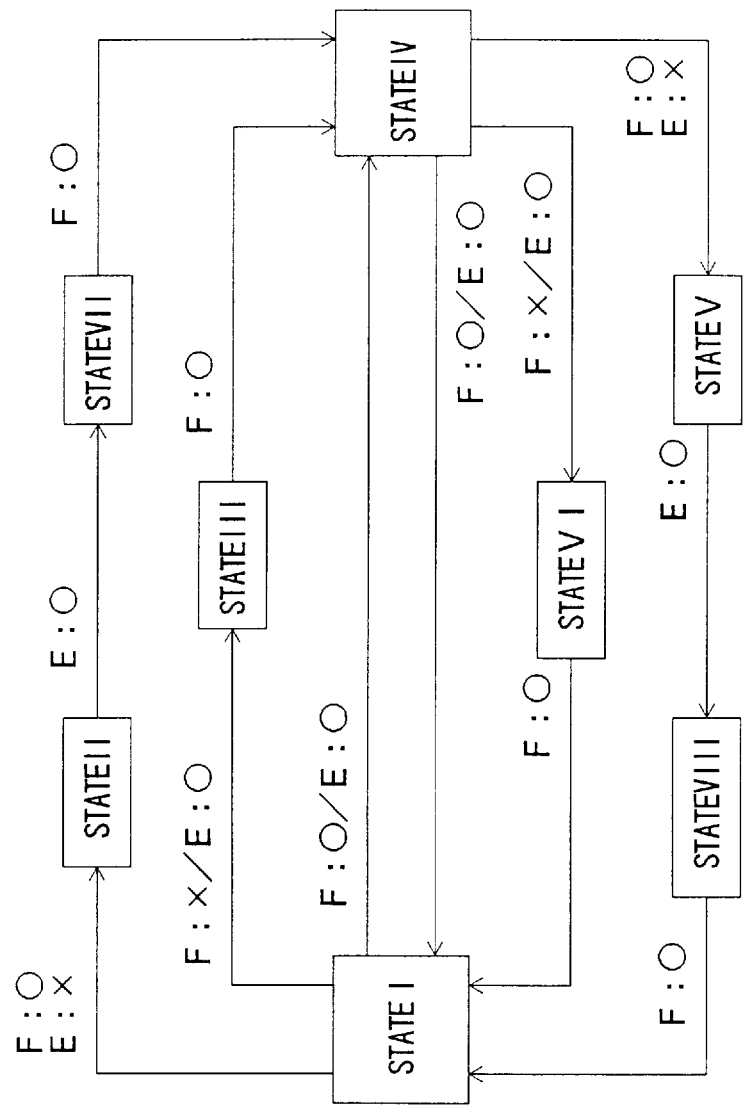
F I G. 6

F I G. 7

| STATE | COMBINATION OF CROSS BAR SWITCH 32 | | | OUTPUT SIGNAL CONTROL | |
|---|---|---|---|---|---|
| | SIGNAL FROM VIDEO SIGNAL INPUT UNIT 10 | SIGNAL FROM 3-D IMAGE GENERATING UNIT 14 | | WRITE SIGNAL W | TIMING SYNC SIGNAL T S |
| I | CONNECT TO MEMORY 33 | CONNECT TO MEMORY 34 | | VALID | INVALID |
| II | CONNECT TO MEMORY 33 | CONNECT TO MEMORY 34 | | INVALID | INVALID |
| III | CONNECT TO MEMORY 33 | CONNECT TO MEMORY 34 | | VALID | VALID |
| IV | CONNECT TO MEMORY 34 | CONNECT TO MEMORY 33 | | VALID | INVALID |
| V | CONNECT TO MEMORY 34 | CONNECT TO MEMORY 33 | | INVALID | INVALID |
| VI | CONNECT TO MEMORY 34 | CONNECT TO MEMORY 33 | | VALID | VALID |
| VII | CONNECT TO MEMORY 34 | CONNECT TO MEMORY 33 | | INVALID | INVALID |
| VIII | CONNECT TO MEMORY 33 | CONNECT TO MEMORY 34 | | INVALID | INVALID |

F I G. 1 1

| COLOR JUDGING MODE | PLOT CONDITION |
|---|---|
| 0 | ALWAYS PLOT |
| 1 | PLOT WHEN st1 |
| 2 | PLOT WHEN st2 |
| 3 | PLOT WHEN st3 |
| 4 | PLOT WHEN st4 |
| 5 | PLOT WHEN st4 & st1 |
| 6 | PLOT WHEN st4 & st2 |
| 7 | PLOT WHEN st4 & st3 |
| 8 | PLOT WHEN st5 |
| 9 | PLOT WHEN st5 & st1 |
| 10 | PLOT WHEN st5 & st2 |
| 11 | PLOT WHEN st5 & st3 |
| 12 | PLOT WHEN st6 |
| 13 | PLOT WHEN st6 & st1 |
| 14 | PLOT WHEN st6 & st2 |
| 15 | PLOT WHEN st6 & st3 |
| 16 | PLOT WHEN st7 |
| 17 | PLOT WHEN st7 & st1 |
| 18 | PLOT WHEN st7 & st2 |
| 19 | PLOT WHEN st7 & st3 |
| 20 | PLOT WHEN st7 & st4 |
| 21 | PLOT WHEN st7, st4 & st1 |
| 22 | PLOT WHEN st7, st4 & st2 |
| 23 | PLOT WHEN st7, st4 & st3 |
| 24 | PLOT WHEN st7 & st5 |
| 25 | PLOT WHEN st7, st5 & st1 |
| 26 | PLOT WHEN st7, st5 & st2 |
| 27 | PLOT WHEN st7, st5 & st3 |
| 28 | PLOT WHEN st7 & st6 |
| 29 | PLOT WHEN st7, st6 & st1 |
| 30 | PLOT WHEN st7, st6 & st2 |
| 31 | PLOT WHEN st7, st6 & st3 |

FIG. 12

| COLOR JUDGING MODE | PLOT CONDITION |
|---|---|
| 3 2 | PLOT WHEN st8 |
| 3 3 | PLOT WHEN st8 & st1 |
| 3 4 | PLOT WHEN st8 & st2 |
| 3 5 | PLOT WHEN st8 & st3 |
| 3 6 | PLOT WHEN st8 & st4 |
| 3 7 | PLOT WHEN st8, st4 & st1 |
| 3 8 | PLOT WHEN st8, st4 & st2 |
| 3 9 | PLOT WHEN st8, st4 & st3 |
| 4 0 | PLOT WHEN st8 & st5 |
| 4 1 | PLOT WHEN st8, st5 & st1 |
| 4 2 | PLOT WHEN st8, st5 & st2 |
| 4 3 | PLOT WHEN st8, st5 & st3 |
| 4 4 | PLOT WHEN st8 & st6 |
| 4 5 | PLOT WHEN st8, st6 & st1 |
| 4 6 | PLOT WHEN st8, st6 & st2 |
| 4 7 | PLOT WHEN st8, st6 & st3 |
| 4 8 | PLOT WHEN st9 |
| 4 9 | PLOT WHEN st9 & st1 |
| 5 0 | PLOT WHEN st9 & st2 |
| 5 1 | PLOT WHEN st9 & st3 |
| 5 2 | PLOT WHEN st9 & st4 |
| 5 3 | PLOT WHEN st9, st4 & st1 |
| 5 4 | PLOT WHEN st9, st4 & st2 |
| 5 5 | PLOT WHEN st9, st4 & st3 |
| 5 6 | PLOT WHEN st9 & st5 |
| 5 7 | PLOT WHEN st9, st5 & st1 |
| 5 8 | PLOT WHEN st9, st5 & st2 |
| 5 9 | PLOT WHEN st9, st5 & st3 |
| 6 0 | PLOT WHEN st9 & st6 |
| 6 1 | PLOT WHEN st9, st6 & st1 |
| 6 2 | PLOT WHEN st9, st6 & st2 |
| 6 3 | PLOT WHEN st9, st6 & st3 |

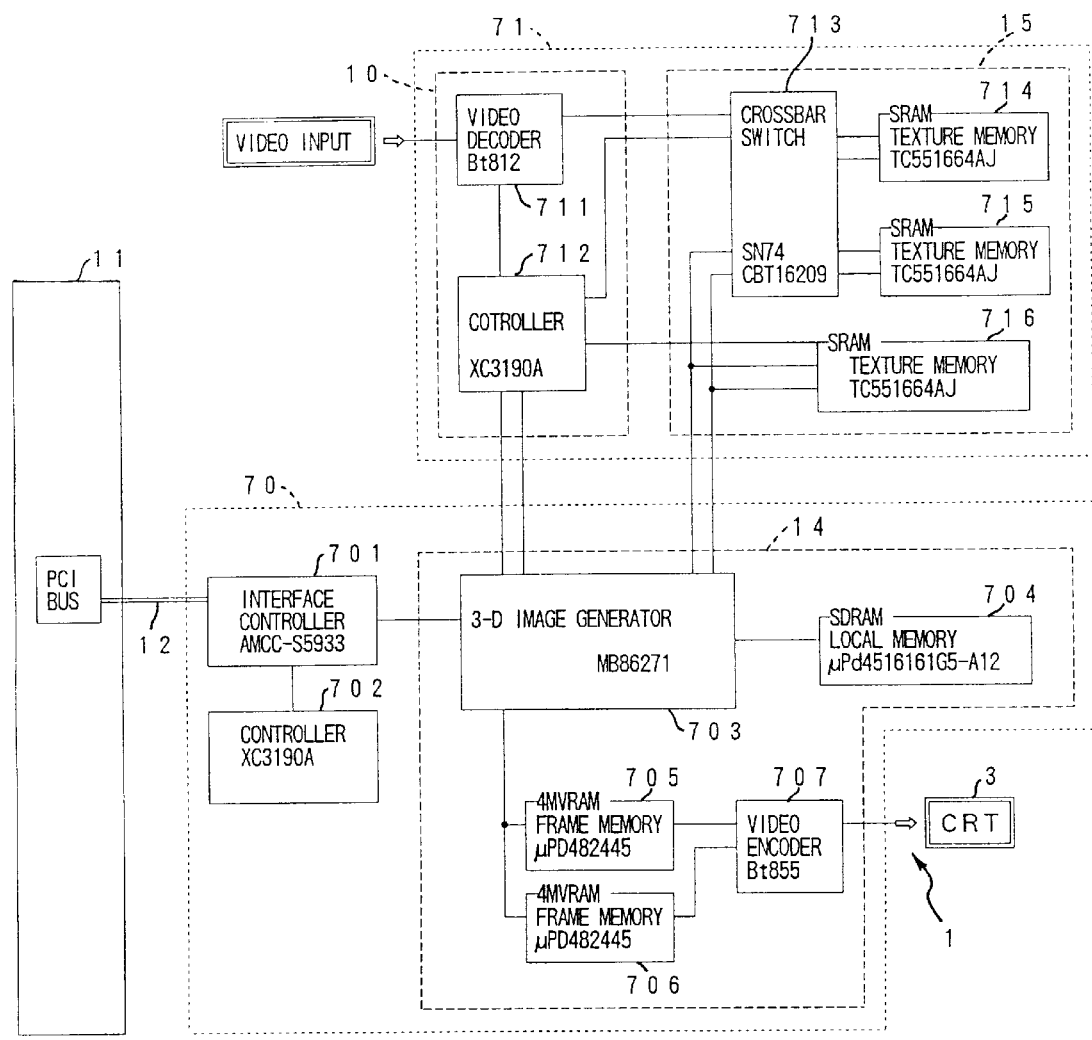
F I G. 1 4

F I G. 1 6
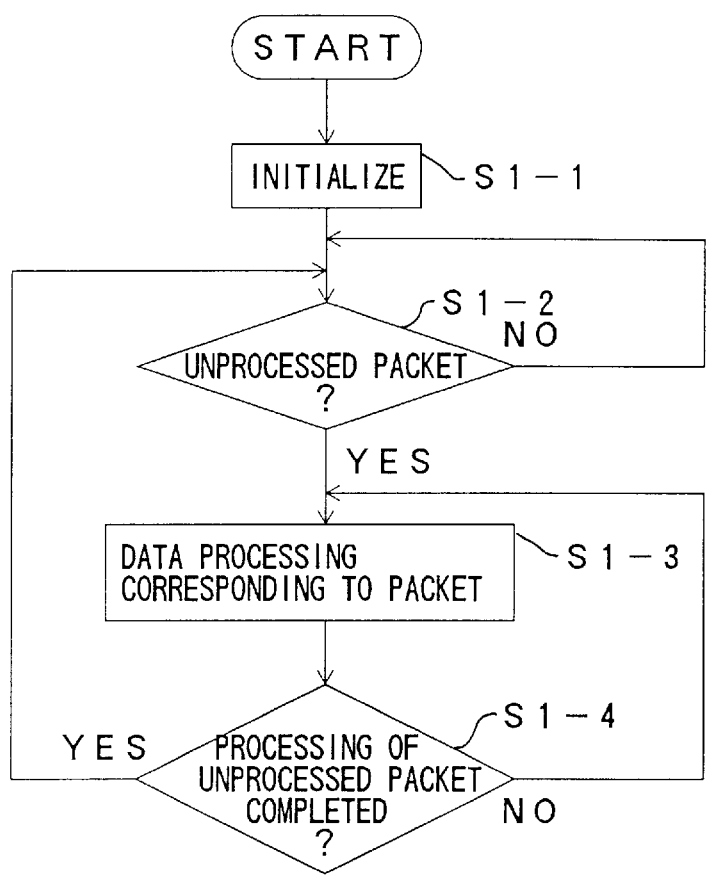

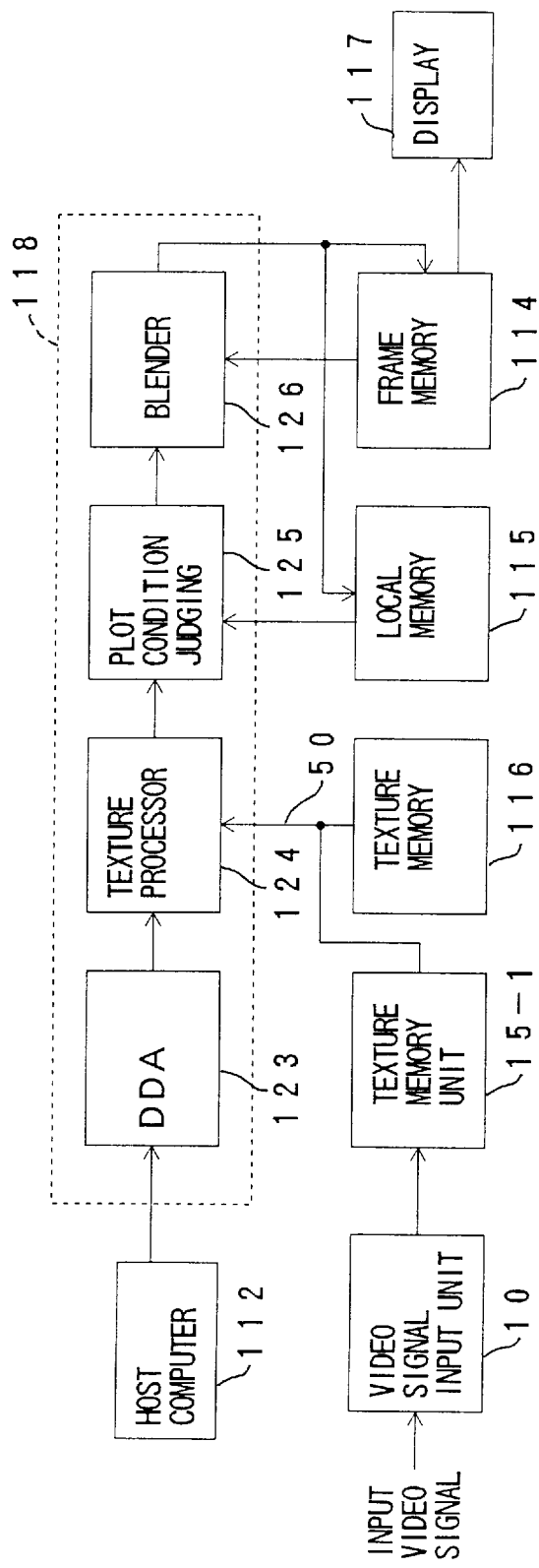

IMAGE INFORMATION PROCESSING APPARATUS HAVING MEANS FOR UNITING VIRTUAL SPACE AND REAL SPACE

BACKGROUND OF THE INVENTION

The present invention generally relates to image information processing apparatuses, and more particularly to an image information processing apparatus which carries out a three-dimensional computer graphic information processing with respect to an input video signal obtained from a video camera or the like.

Recently, in fields such as entertainment using games and multi-media utilizing computers, a three-dimensional computer graphics is used to treat three-dimensional objects having motion. However, in the three-dimensional computer graphics, the shape of the three-dimensional object is decomposed into a plurality of polygons so as to describe a three-dimensional virtual object by approximation, in order to realize a high-speed information processing. For this reason, the three-dimensional computer graphics is unsuited for making a delicate description of the real world such as the facial expression of a person.

Accordingly, there are demands to unite the virtual space and the real space by the three-dimensional computer graphics without discontinuity, so as to enable a more delicate description.

Conventionally, a special apparatus has been proposed to display a video image in which the virtual space and the real space are united. This special apparatus carries out a three-dimensional computer graphic process directly with respect to an input video signal which is obtained from a video camera or the like. A television commercial in which an animation character or figure moves in the virtual space with respect to the real space which is used as a background is one example of the video image in which the virtual space and the real space are united. However, this special apparatus is designed exclusively for the video image, and there were problems in that the construction of this special apparatus is complicated and this special apparatus is expensive.

It would be very convenient if the video signal could be processed in a conventional three-dimensional computer graphics generating apparatus. However, the conventional three-dimensional computer graphics generating apparatus is designed to generate the three-dimensional computer graphics based on an instruction from a host processor. For this reason, the conventional three-dimensional computer graphics generating apparatus was not provided with a function of directly inputting the video signal.

SUMMARY OF THE INVENTION

Accordingly, it is a general object of the present invention to provide a novel and useful image information processing apparatus in which the problems described above are eliminated.

Another and more specific object of the present invention is to provide an image information processing apparatus comprising a cross bar switch circuit receiving first image information which indicates a two-dimensional image and second image information which indicates three-dimensional computer graphics describing a three-dimensional object by approximation using a plurality of polygons, an arbitration circuit controlling a connection of the cross bar switch circuit according to a predetermined rule based on a synchronizing signal which is related to the first image information, and memory means having a first memory region and a second memory region which is different from the first memory region, the memory means being capable of reading information from the second memory region during a time in which image information output from the cross bar switch circuit is written in the first memory region. According to the image information processing apparatus of the present invention, it is possible to simultaneously realize a real-time processing of the video signal and a free three-dimensional computer graphic process with respect to the video signal, using circuits having relatively simple circuit construction. Further, it is possible to unite the virtual space and the real space by the three-dimensional computer graphics without discontinuity.

Other objects and further features of the present invention will be apparent from the following detailed description when read in conjunction with the accompanying drawings.

BRIEF DESCRIPTION OF THE DRAWINGS

FIG. 6 is a diagram showing state transitions of an arbitration circuit;

FIG. 7 is a diagram showing the relationship between the states of the arbitration circuit and connection states of a cross-bar switch circuit;

FIG. 11 is a diagram for explaining color judging modes and plotting conditions;

FIG. 12 is a diagram for explaining the color judging modes and the plotting conditions;

FIG. 14 is a system block diagram showing the general construction of a second embodiment of the image information processing apparatus according to the present invention;

FIG. 16 is a flow chart for explaining the general operation of the image information processing system when carrying out an information processing;

FIG. 19 is a system block diagram showing the general construction of the graphic hardware part together with characterizing parts of the present invention.

DESCRIPTION OF THE PREFERRED EMBODIMENTS

Figure 1:
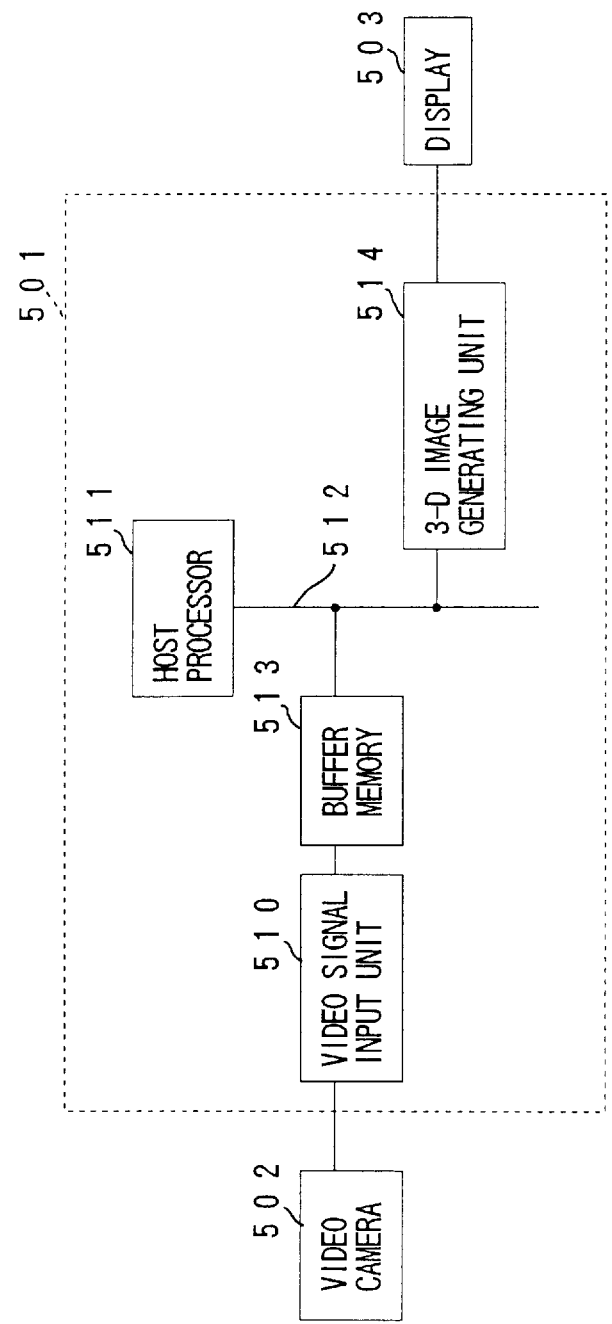
FIG. 1 is a system block diagram showing the general construction of a first conceivable three-dimensional computer graphics generating apparatus which can also process a video signal.

FIG. 1 is a system block diagram showing the general construction of a first conceivable three-dimensional computer graphics generating apparatus which can also process a video signal. A three-dimensional computer graphics generating apparatus 501 shown in FIG. 1 receives an input video signal from a video camera 502, and displays three-dimensional image data as a processed result on a display 503. The three-dimensional computer graphics generating apparatus 501 generally includes a video signal input unit 510, a host processor 511, a input buffer memory 513 and a three-dimensional image generating unit 514. The input buffer memory513 and the three-dimensional image generating unit 514 are coupled to the host processor 511 via a system bus 512.

The input video signal which is obtained from the video camera 502 is input to the video signal input unit 510 and is temporarily stored in the input buffer memory 513 as image data. The image data stored in the input buffer memory 513 are supplied to the three-dimensional image generating unit 514 via the system bus 512 under a control of the host processor 511. The three-dimensional image generating unit 514 carries out a three-dimensional computer graphic process with respect to the image data based on an instruction from the host processor 511, and displays processed three-dimensional image data on the display 503.

Figure 2:
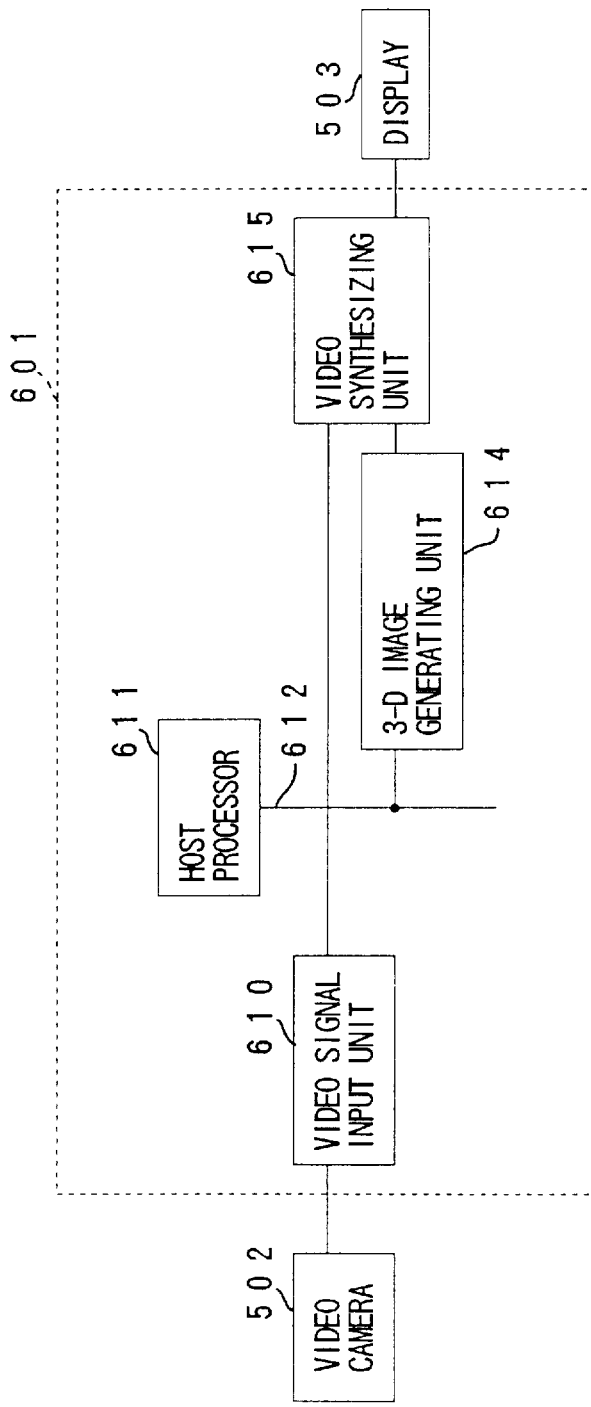
FIG. 2 is a system block diagram showing the general construction of a second conceivable three-dimensional computer graphics generating apparatus which can also process the video signal.

FIG. 2 is a system block diagram showing the general construction of a second conceivable three-dimensional computer graphics generating apparatus which can also process the video signal. A three-dimensional computer graphics generating apparatus 601 shown in FIG. 2 receives the input video signal from the video camera 502, and displays the three-dimensional image data as the processed result on the display 503. The three-dimensional computer graphics generating apparatus 601 generally includes a video signal input unit 610, a host processor 611, a three-dimensional image generating unit 614 and a video synthesizing unit 615. The three-dimensional image generating unit 614 is coupled to the host processor 611 via a system bus 612.

The input video signal which is obtained from the video camera 502 is input to the video signal input unit 610 and is supplied the video synthesizing unit 615 as image data. The three-dimensional image generating unit 614 carries out a three-dimensional computer graphic process based on an instruction from the host processor 611, and supplies graphic data to the video synthesizing unit 615. The video synthesizing unit 615 synthesizes the image data from the video signal input unit 610 and the graphic data from the three-dimensional image generating unit 614, and synthesized three-dimensional image data from the video synthesizing unit 615 are displayed on the display 503.

According to the first conceivable three-dimensional computer graphics generating apparatus shown in FIG. 1, the image data from the video signal input unit 610 are supplied to the three-dimensional image generating unit 614. Hence, it is possible to carry out the three-dimensional computer graphic process directly with respect to the video signal. However, because the image data must be transferred via the system bus 513, there is an overhead of the image data transfer, and there is a problem in that it is difficult to realize the image processing in real-time.

On the other hand, according to the second conceivable three-dimensional computer graphics generating apparatus shown in FIG. 2, there is no overhead of the image data transfer. Thus, it is possible to carry out the image processing in real-time. However, since the image data from the video signal input unit 610 are not supplied to the three-dimensional image generating unit 614, the video synthesizing unit 615 simply superimposes the image data picked up by the video camera 502 on the graphic data received from the three-dimensional image generating unit 614. For this reason, there is a problem in that it is impossible to carry out the three-dimensional computer graphic process directly with respect to the video signal.

In other words, it would be very convenient if the conventional three-dimensional computer graphics generating apparatus could also process the video signal, but the conventional three-dimensional computer graphics generating apparatus is designed to generate the three-dimensional computer graphics based on the instruction from the host processor, and is not provided with a function of directly inputting the video signal. Hence, it is conceivable to realize a three-dimensional computer graphics generating apparatus which is added with a function of directly inputting the video signal, as shown in FIGS. 1 and 2. However, even in the case of the first and second conceivable three-dimensional computer graphics generating apparatuses described above in conjunction with FIGS. 1 and 2, it is impossible to simultaneously realize the real-time processing of the video signal and a free three-dimensional computer graphic process with respect to the video signal.

Therefore, an object of the present invention is to simultaneously realize the real-time processing of the video signal and the free three-dimensional computer graphic process with respect to the video signal.

An image information processing apparatus according to the present invention is applied to a three-dimensional computer graphics processing apparatus which describes a three-dimensional object by a plurality of polygons using approximation, for example. The image information processing apparatus is provided with an image information input function for inputting a video signal from a video camera or the like in order to input external information. The image information processing apparatus is also provided with a three-dimensional image generating function for generating three-dimensional computer graphics. This three-dimensional image generating function can also carry out a three-dimensional process with respect to the original video signal. Accordingly, the three-dimensional image generating function can output image data such as image data related to the three-dimensional computer graphics, image data related to the video signal which is subjected to the three-dimensional process, and image data related to a synthesized result of the three-dimensional computer graphics and the video signal which is subjected to the three-dimensional process. For example, the output image data is displayed on a display unit as a three-dimensional image.

Therefore, according to the present invention, it is possible to simultaneously realize the real-time processing of the video signal and the free three-dimensional computer graphic process with respect to the video signal.

Figure 3:
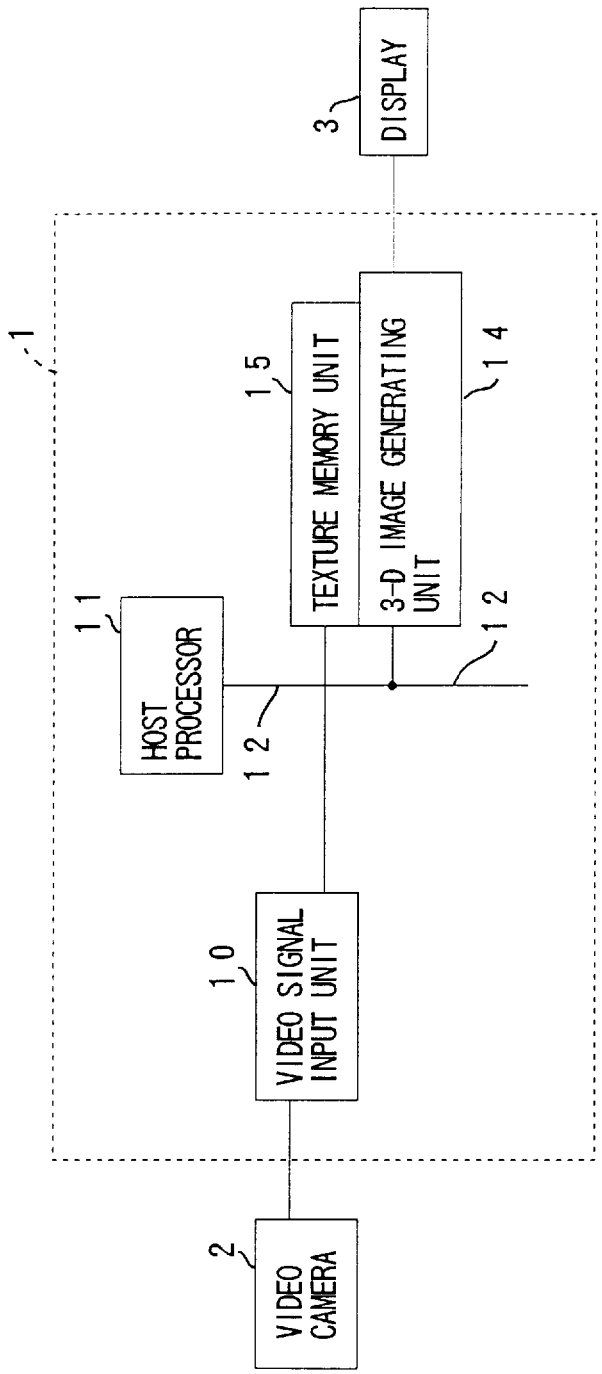
FIG. 3 is a system block diagram showing the general construction of a first embodiment of an image information processing apparatus according to the present invention.

A description will now be given of a first embodiment of the image information processing apparatus according to the present invention. FIG. 3 is a system block diagram showing the general construction of the first embodiment of the image information processing apparatus.

A three-dimensional computer graphics generating apparatus 1 shown in FIG. 3 receives an input video signal which is obtained from a video camera 2, and a processed result is displayed on a display 3 as three-dimensional image data. The three-dimensional computer graphics generating apparatus 1 generally includes a video signal input unit 10, a host processor 11, a three-dimensional image generating unit 14 which is coupled to the host processor 11 via a system bus 12, and a texture memory unit 15 which is coupled to the video signal input unit 10.

The input video signal from the video camera 2 is input to the video signal input unit 10 and is supplied to the texture memory unit 15 as image data. The three-dimensional image generating unit 14 carries out a three-dimensional computer graphic process with respect to the input video signal based on an instruction from the host processor 11, and supplies three-dimensional image data to the display 3. As a result, the display 3 displays the image data related to the three-dimensional computer graphics, the image data related to the video signal which is subjected to the three-dimensional process or the image data related to the synthesized result of the three-dimensional computer graphics and the video signal which is subjected to the three-dimensional process, which image data are obtained from the three-dimensional image generating unit 14.

The host processor 11 transfers two-dimensional image data such as patterns to the texture memory unit 15 in advance. The three-dimensional image generating unit 14 appropriately makes access to the texture memory unit 15, and carries out a process of pasting two-dimensional images as patterns onto surfaces of the polygons which are to be generated. In this embodiment, a read process is possible from the three-dimensional image generating unit 14 with respect to the texture memory unit 15. In addition, a write process is possible from the video signal input unit 10 with respect to the texture memory unit 15 so as to directly write the two-dimensional image data that are derived from the video signal. Hence, the three-dimensional image generating unit 14 can carry out the process of pasting the two-dimensional image data which are derived from the video signal as the patterns onto the surfaces of the polygons which are to be generated, without overhead, similarly to processing the general two-dimensional image data related to patterns from the texture memory unit 15.

Figure 4:
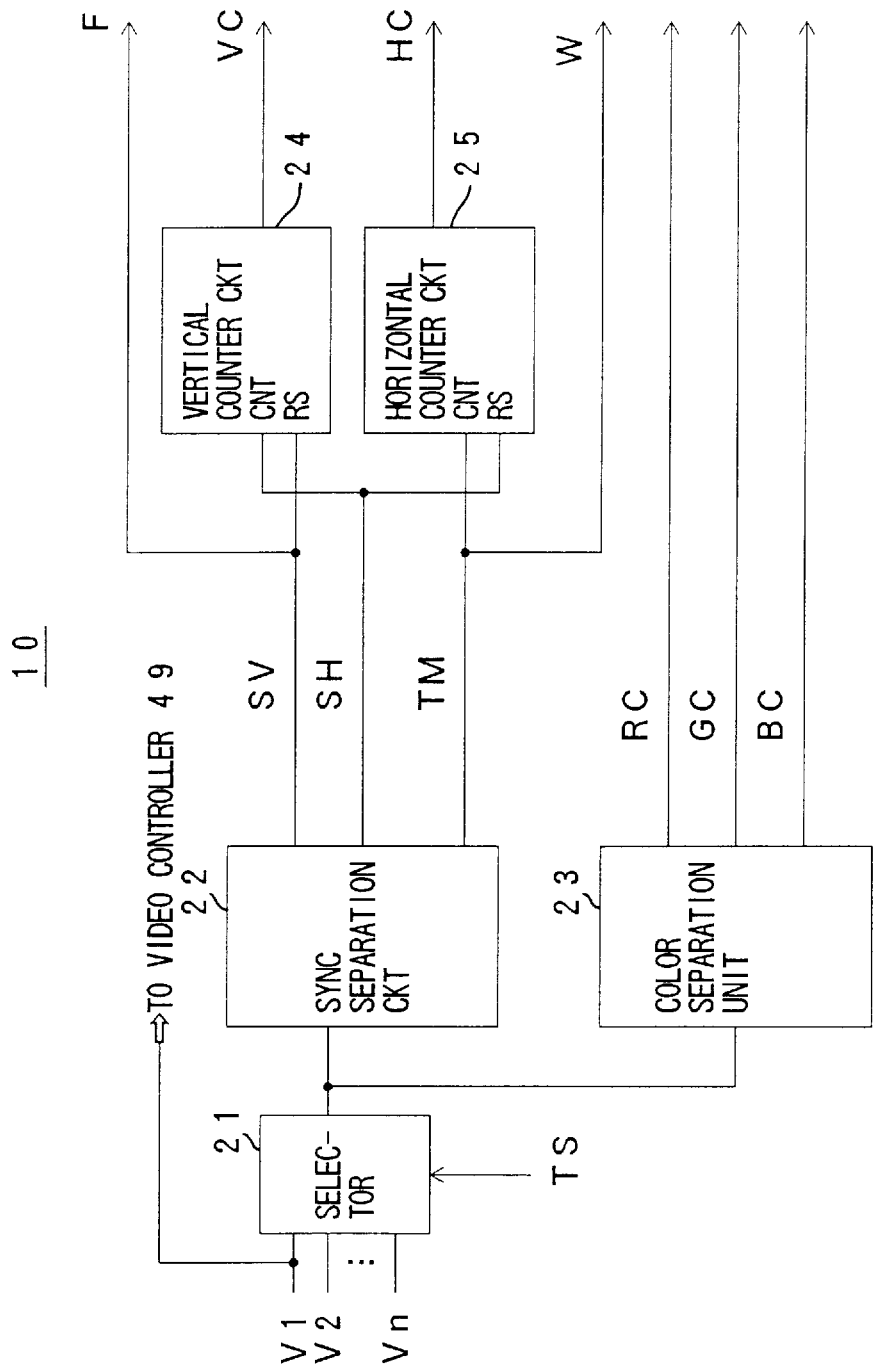
FIG. 4 is a system block diagram showing the general construction of an embodiment of a video signal input unit.

FIG. 4 is a system block diagram showing the general construction of an embodiment of the video signal input unit 10. The video signal input unit 10 generally includes a selector 21, a synchronous separation circuit 22, a color separation circuit 23, a vertical counter circuit 24 and a horizontal counter circuit 25 which are connected as shown in FIG. 4.

The selector 21 selects one video signal from a plurality of input video signals V1 through Vn in response to a timing synchronizing signal TS from the texture memory unit 15, and supplies the selected video signal to the synchronous separation circuit 22 and the color separation circuit 23. The timing synchronizing signal TS will be described later. For example, when synthesizing two images, the selector 21 successively outputs two input video signals. The input video signals V1 through Vn are received from the video camera 2 or the like, and are in conformance with a television system such as the NTSC system and the PAL system. The input video signal V1 is also supplied to a video controller of the three-dimensional image generating unit 14 which will be described later, and is used as a reference signal when generating an output video signal.

The synchronous separation circuit 22 separates a vertical synchronizing signal SV and a horizontal synchronizing signal SH based on one video signal Vi which is obtained from the selector 21, and generates a pixel timing signal TM in units of pixels of the video signal Vi, where i=1, ..., n. The vertical synchronizing signal SV is supplied to a reset terminal RS of the vertical counter circuit 24, and the horizontal synchronizing signal SH is supplied to a count terminal CNT of the vertical counter circuit 24 and to a reset terminal RS of the horizontal counter circuit 25. In addition, the pixel timing signal TM is supplied to a count terminal CNT of the horizontal counter circuit 25.

Based on the video signal Vi obtained from the selector 21, the color separation circuit 23 separates digital values RC, GC and BC of each of the color components of red, green and blue for each of the pixels. In the case of the general video signal processing, the signal processing in many cases is carried out using the luminance-color difference components. On the other hand, when generating the three-dimensional image, the texture memory is used in many cases with respect to each of the color components of red, green and blue. Hence, in this embodiment, the color separation circuit 23 separates and outputs the digital values RC, GC and BC of each of the color components of red, green and blue. If the texture memory unit 15 can carry out the signal processing using the luminance-color difference components, it is of course not essential for the color separation circuit 23 to separate each of the color components of red, green and blue.

The vertical counter circuit 24 counts the horizontal synchronizing signal SH, and generates a vertical coordinate VC within the texture memory unit 15 where the digital values RC, GC and BC of each of the color components of red, green and blue are to be stored. One picture, that is, one frame, of the video signal Vi is repeated for every vertical synchronizing signal SV. Hence, the vertical counter circuit 24 is reset by the vertical synchronizing signal SV, and obtains the vertical coordinate VC by counting up for every horizontal synchronizing signal SH after the vertical synchronization. The vertical synchronizing signal SV is supplied to the texture memory unit 15 which will be described later, as a frame signal F which indicates the completion of 1 picture (frame).

The horizontal counter circuit 25 counts the pixel timing signal TM, and generates a horizontal coordinate HC within the texture memory unit 15 where the digital values RC, GC and BC of each of the color components of red, green and blue are to be stored. The horizontal counter circuit 25 is reset by the horizontal synchronizing signal SH, and obtains the horizontal coordinate HC by counting up for every pixel timing signal TM after the horizontal synchronization. The pixel timing signal TM is supplied to the texture memory unit 15, as a write signal W which indicates a write timing to the texture memory unit 15.

Figure 5:
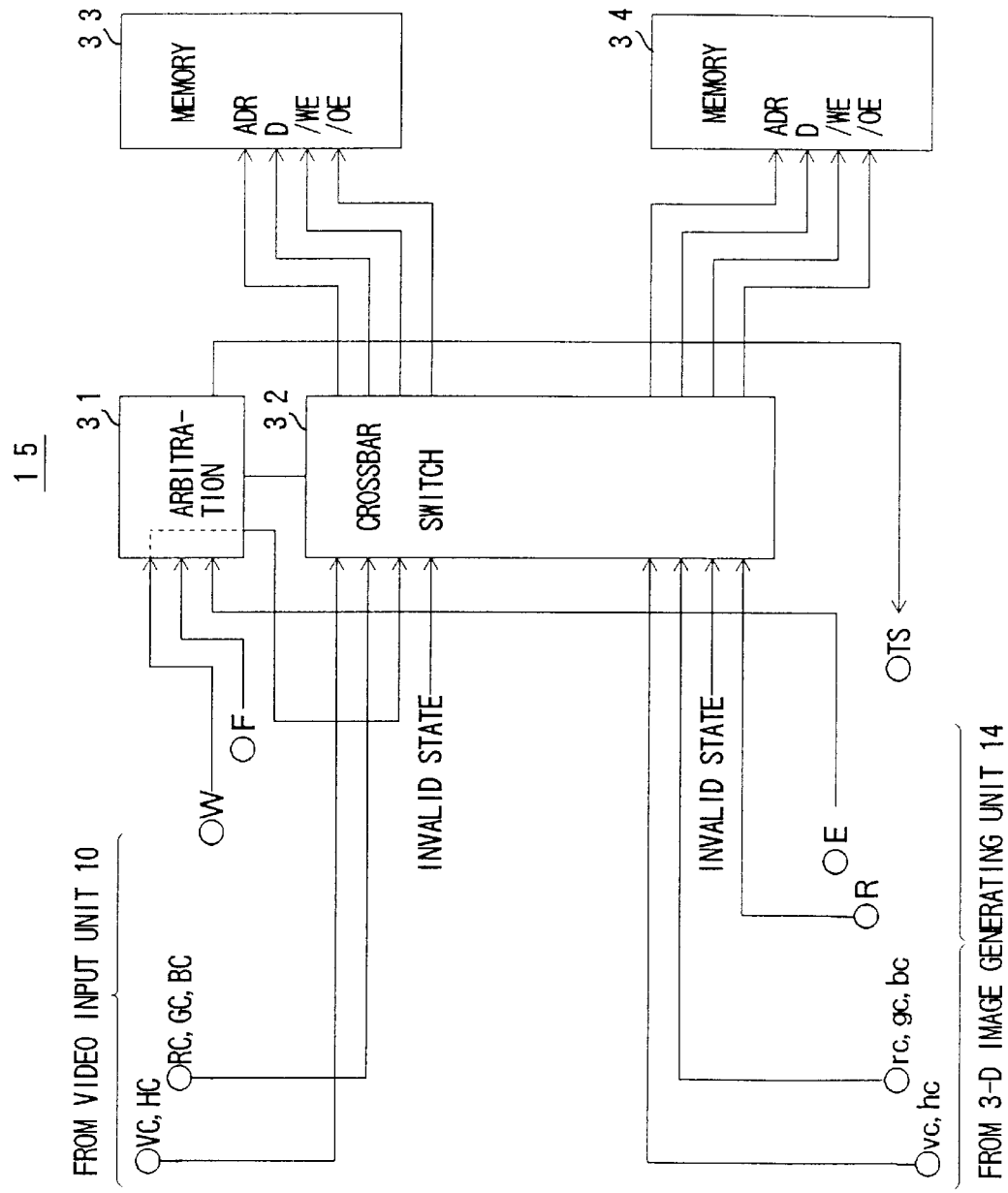
FIG. 5 is a system block diagram showing the general construction of an embodiment of a texture memory unit.

FIG. 5 is a system block diagram showing the general construction of an embodiment of the texture memory unit 15. The texture memory unit 15 includes an arbitration circuit 31, a cross-bar switch circuit 32, and memories 33 and 34 which are connected as shown in FIG. 5.

The memories 33 and 34 form a texture memory, and are used to store the two-dimensional image data derived from the video signal Vi. When a write enable signal /WE applied to a write enable terminal /WE is valid, that is, "0", the two-dimensional image data applied to a data terminal D are written in each of the memories 33 and 34 at the coordinates specified by an address signal ADR which is applied to an address terminal ADR. In addition, when a read (or output) enable signal /OE applied to a read (or output) enable terminal /OE is valid, that is, "0", the stored two-dimensional data are read from the coordinates specified by the address signal ADR applied to the address terminal ADR from each of the memories 33 and 34 and output from the data terminal D.

The address signal ADR is generated based on the vertical and horizontal synchronizing signals VC and HC or, based on vertical and horizontal coordinates vc and hc which will be described later.

The vertical and horizontal coordinates VC and HC and the digital values RC, GC and BC of each of the color components of red, green and blue from the video signal input unit 10, the vertical and horizontal coordinates vc and hc, digital values rc, gc and bc of each of the color components of red, green and blue, an image complete signal E and a read signal R from the three-dimensional image generating unit 14 which will be described later, and signals from the arbitration circuit 31 are supplied to the cross-bar switch circuit 32. A connection state of the cross-bar switch circuit 32 is determined depending on the signal from the arbitration circuit 31, and the signals from the video signal input unit 10 are stored in the memory 33 and the signals from the three-dimensional image generating unit 14 are stored in the memory 34 or, the signals from the video signal input unit 10 are stored in the memory 34 and the signals from the three-dimensional image generating unit 14 are stored in the memory 33. Basically, only the write process is carried out from the video signal input unit 10 with respect to the memories 33 and 34, and thus, the read enable signal /OE with respect to the memory 33 or 34 is set invalid, that is, set to "1". On the other hand, the three-dimensional image generating unit 14 basically carries out only the read process with respect to the memories 33 and 34, and for this reason, the write enable signal /WE with respect to the memory 33 or 34 is set invalid, that is, set to "1".

The arbitration circuit 31 determines the connection state of the cross-bar switch circuit 32 according to state transitions shown in FIGS. 6 and 7, based on the frame signal F from the video signal input unit 10 and the image complete signal E from the three-dimensional image generating unit 14. FIG. 6 shows a state transition diagram of the arbitration circuit 31, and FIG. 7 shows the relationship of the state of the arbitration circuit 31 and the connection state of the cross-bar switch circuit 32. In FIG. 6, a circular mark "o" indicates "valid", and a cross mark "x" indicates "invalid". As shown in FIGS. 6 and 7, the arbitration circuit 31 has 8 states I through VIII, and the connection state of the cross-bar switch circuit 32 is determined as shown in each state of the arbitration circuit 31.

The arbitration circuit 31 also receives the write signal W from the video signal input unit 10, and carries out a process of forcibly setting the write enable signal /WE with respect to the memory 33 or 34 invalid based on the state of the arbitration circuit 31. The arbitration circuit 31 also generates and outputs the timing synchronizing signal TS with respect to the video signal input unit 10 and the three-dimensional image generating unit 14. When the timing synchronizing signal TS is valid, the three-dimensional image generating unit 14 waits until the timing synchronizing signal TS becomes invalid to generate the three-dimensional image.

By providing the arbitration circuit 31 and the texture memory which is made up of the memories 33 and 34 in two systems, it is possible to write the image data from the video signal input unit 10 to the memory 34 (or 33) even while the three-dimensional image generating unit 14 reads the image data from the other memory 33 (or 34). Accordingly, the two-dimensional image data derived from the video signal Vi can be used as the patterns to be pasted without interruption when generating the three-dimensional image. In other words, the three-dimensional image generating unit 14 can carry out the process of pasting the two-dimensional image data derived from the video signal as patterns onto the surfaces of the polygons to be generated, without overhead, similarly to the case where the two-dimensional image data related to patterns or the like which are obtained from the texture memory unit 15 are processed.

Figure 8:
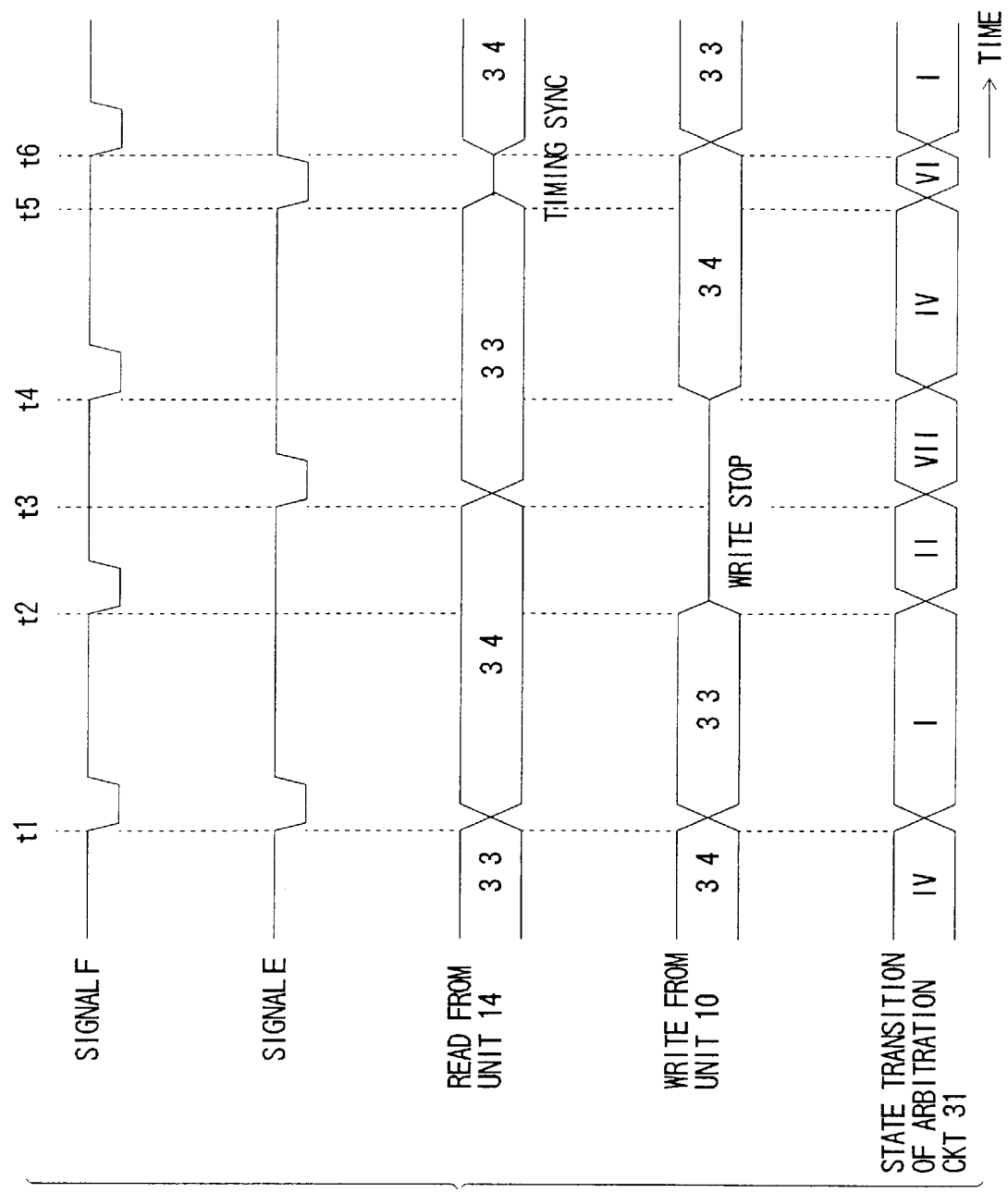
FIG. 8 is a timing chart for explaining the operation timings of the first embodiment.

FIG. 8 is a timing chart for explaining the operation timing of this embodiment. FIG. 8 shows the timings of the frame signal F, the image complete signal E, the read process of the three-dimensional image generating unit 14 with respect to the memories 33 and 34, the write process of the video signal input unit 10 with respect to the memories 33 and 34, and the state transition of the arbitration circuit 31. In FIG. 8, "33" and "34" respectively indicate the memories 33 and 34 of the texture memory unit 15 which are being accessed, and I through VIII indicate the states of the arbitration circuit 31.

In FIG. 8, the arbitration circuit 31 assumes the state IV in the initial state, and the input video signal is written to the memory 34 while the video signal stored in the memory 33 is read by the three-dimensional image generating unit 14. In this state, when the frame signal F and the image complete signal E are simultaneously generated at a time t1, the accesses to the memories 33 and 34 are reversed. That is, the read process is made with respect to the memory 34 and the write process is made with respect to the memory 33, and the state of the arbitration circuit 31 makes a transition to the state I.

When the writing of one picture (frame) of the input video signal to the memory 33 is completed and the frame signal F is generated at a time t2, the state of the arbitration circuit 31 makes a transition to the state II, and the write signal W becomes invalid. For this reason, the writing of the input video signal with respect to the memory 33 is interrupted, and this writing waits until the reading of the video signal from the memory 34 by the three-dimensional image generating unit 14 is completed.

When the reading of the video signal from the memory 34 by the three-dimensional image generating unit 14 is completed and the frame signal F is generated at a time t3, the state of the arbitration circuit 31 makes a transition to the state VII, and the accesses to the memories 33 and 34 are reversed. In this case, however, the writing of the input video signal to the memory 34 remains interrupted until the next frame signal F is generated, and the arbitration circuit 31 maintains the state VII. Unless the writing of the input video signal to the memory 34 is interrupted in this manner until the next frame signal F is generated, the video signal amounting to one frame would be written between the frame signals F, and the writing would start at the time t3 from the image related to an intermediate portion of the frame. When the next frame signal F is generated at a time t4, the arbitration circuit 31 makes a transition to the state IV, and the writing of the input video signal to the memory 34 is started.

When the image complete signal E from the three-dimensional image generating unit 14 is generated first at a time t5, the timing synchronizing signal TS becomes valid because the writing of the input video signal to the memory 34 is not yet completed, and the arbitration circuit 31 makes a state transition to the state VI. The arbitration circuit 31 maintains the state VI until the frame signal F is generated, and the access to the memory 34 is waited. When the writing of the input video signal to the memory 34 is completed and the frame signal F is generated at a time t6, the accesses to the memories 33 and 34 are reversed, and the arbitration circuit 31 makes a state transition to the state I.

Figure 9:
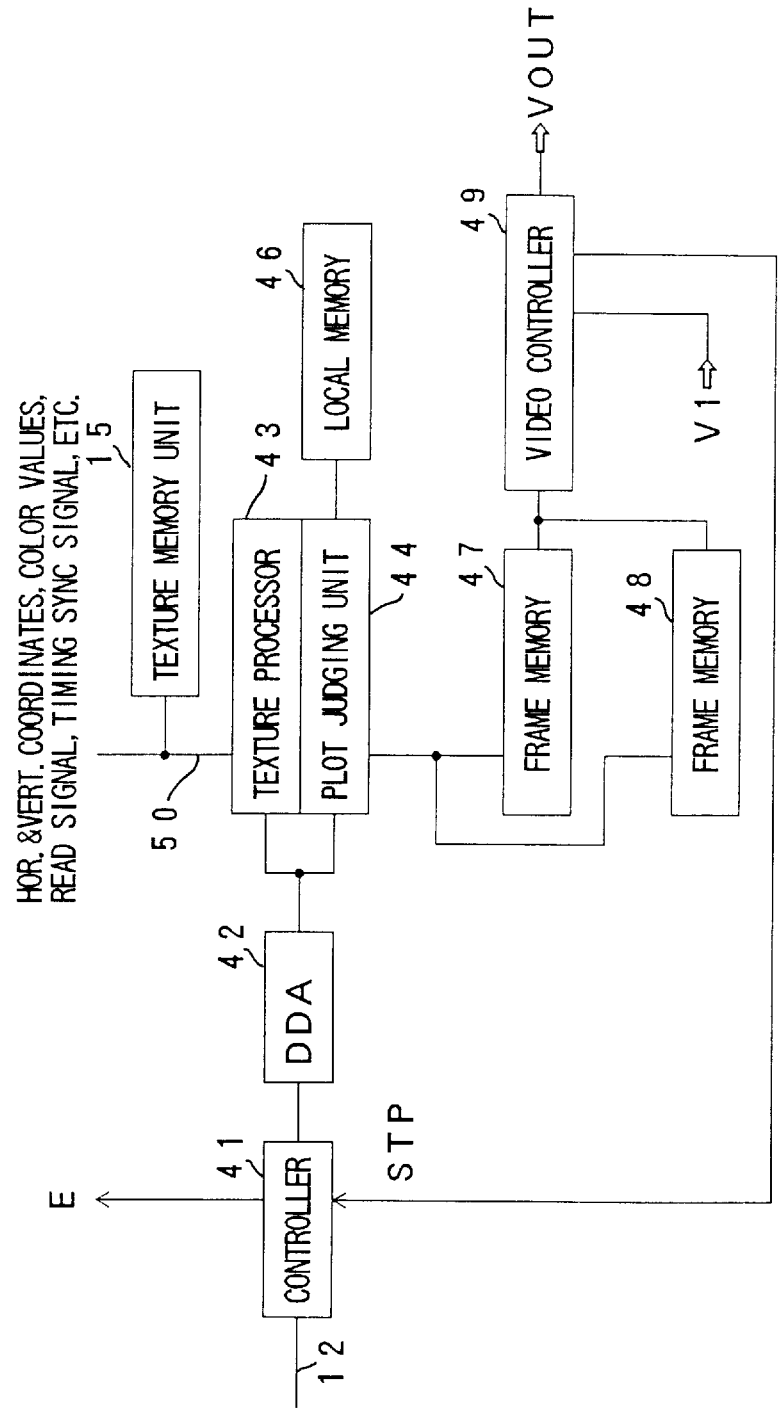
FIG. 9 is a system block diagram showing the general construction of an embodiment of a three-dimensional image generating unit.

FIG. 9 is a system block diagram showing the general construction of an embodiment of the three-dimensional image generating unit 14. The three-dimensional image generating unit 14 includes a controller 41, a linear interpolation processor (DDA) 42, a texture processor 43, a plot judging unit 44, a local memory 46, frame memories 47 and 48, and a video controller which are connected as shown in FIG. 9. The texture memory unit 15 is coupled to the texture processor 43 and the plot judging unit 44 via a texture bus 50. In this embodiment, the texture memory unit 15 includes a third memory (not shown) in addition to the memories 33 and 34 shown in FIG. 5.

The controller 41 is coupled to the system bus 12, and sets necessary information in the DDA 42 by analyzing the coordinates of the polygons supplied from the host processor 11 shown in FIG. 3. The DDA 42 calculates the coordinates and the color values of the polygons when the polygons are decomposed into units of 1 pixel. The texture processor 43 makes access to the third memory of the texture memory unit 15 via the texture bus 50, and calculates the color values of the patterns to be projected on, that is, pasted on the surfaces of the polygons.

The texture memory unit 15 prestores in the third memory the two-dimensional image data related to the patterns or the like to be pasted on the surfaces of the polygons which are to be generated. In addition, the texture memory unit 15 stores the two-dimensional image data derived from the video signal Vi in the memories 33 and 34, and the texture bus 50 connected to the texture memory unit 15 is extended so as to enable access from the texture processor 43. The vertical coordinates VC and vc, the horizontal coordinates HC and hc, the color values RC, rc, GC, gc, BC and bc, the write signal W, the read signal R, the timing synchronizing signal TS and the like are transferred on the texture bus 50. Accordingly, texture information that is accessible from the texture processor 43 of the three-dimensional image generating unit 14 to the texture memory unit 15 includes the two-dimensional image data related to the patterns or the like to be pasted on the surfaces of the polygons and the two-dimensional image data derived from the video signal Vi.

The plot judging unit 44 judges whether or not to plot in the frame memories 47 and 48 based on depth information and color information of the pixels stored in the local memory 46. The plot judging unit 44 compares the depth information of the pixel which is already plotted and the depth information of the pixel which is generated by the DDA 42 and is to be newly plotted, and newly plots only the pixel located further in the front and does not plot the pixel located further at the back, thereby realizing the three-dimensional image processing. Such a function itself of the plot judging unit 44 is known. In this embodiment, in addition to this known function, the plot judging unit 44 carries out judging processes shown in FIGS. 10A through 10C with respect to the color information of the pixels which are to be plotted and are obtained in the texture processor 43, and also has 64 color judging modes as shown in FIGS. 11 and 12. The minimum values and maximum values for the color values of each of the colors of red, green and blue, and the color judging mode to be used are specified in advance. Hence, by specifying other than the unwanted color of the background or the like in addition to specifying the minimum and maximum values of each of the color values and the color judging mode, it becomes possible to extract only a target pixel excluding the background. In this case, it becomes possible to realize a process equivalent to a chroma key processing which is generally carried out when a video signal synthesizing process is made.

Figure 10A:
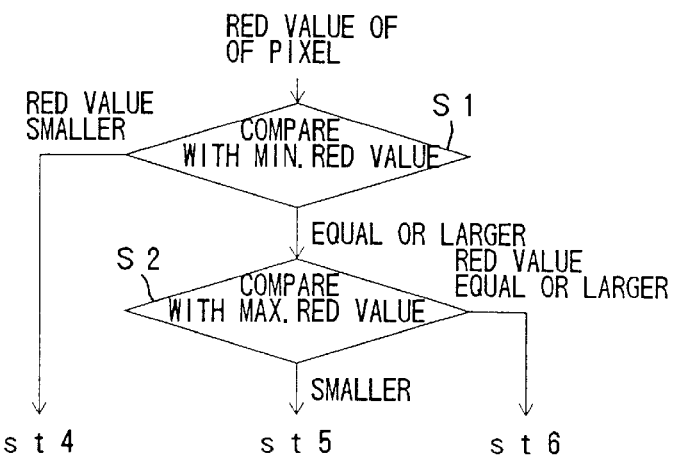
FIGS. 10A, 10B and 10C respectively are flow charts for explaining the processes of a plot judging unit with respect to each color value of pixels.
Figure 10B:
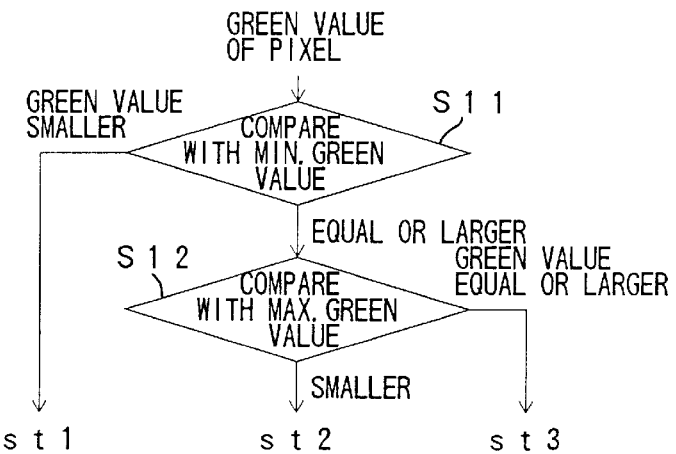
Figure 10C:
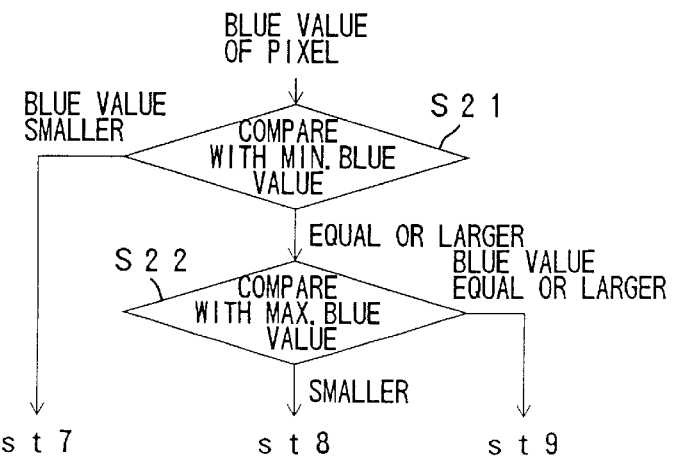

FIGS. 10A through 10C respectively are flow charts for explaining the processes of the plot judging unit 44. FIG. 10A shows the process with respect to the red value of the pixel, FIG. 10B shows the process with respect to the green value of the pixel, and FIG. 10C shows the process with respect to the blue value of the pixel. The processes shown in FIGS. 10A through 10C are carried out in parallel.

In FIG. 10A, a step S1 compares the red value of the pixel and the minimum value of the red value, and a state st4 is set when the red value is smaller than the minimum value. On the other hand, when the red value is greater than or equal to the minimum value, a step S2 compares the red value and the maximum value of the red value. A state st5 is set when the red value is smaller than the maximum value, and a state st6 is set when the red value is greater than or equal to the maximum value.

In FIG. 10B, a step S11 compares the green value of the pixel and the minimum value of the green value, and a state st1 is set when the green value is smaller than the minimum value. On the other hand, when the green value is greater than or equal to the minimum value, a step S12 compares the green value and the maximum value of the green value. A state st2 is set when the green value is smaller than the maximum value, and a state st3 is set when the green value is greater than or equal to the maximum value.

In FIG. 10C, a step S21 compares the blue value of the pixel and the minimum value of the blue value, and a state st7 is set when blue red value is smaller than the minimum value. On the other hand, when the blue value is greater than or equal to the minimum value, a step S22 compares the blue value and the maximum value of the blue value. A state st8 is set when the blue value is smaller than the maximum value, and a state st9 is set when the blue value is greater than or equal to the maximum value.

As shown in FIG. 11, when the color judging mode is "4", for example, the plot judging unit 44 plots when the state st4 is set. In addition, when the color judging mode is "15", for example, the plot judging unit 44 plots when both the states st6 and st3 are set. Furthermore, when the color judging mode is "51", for example, the plot judging unit 44 plots when both the states st9 and st3 are set. As may be seen from the plot conditions shown in FIGS. 11 and 12, the provision of the color judging modes makes it possible to easily make an image editing which includes editing and separating only a predetermined color portion within the image, such as the chroma key processing. The relationship of the color judging modes and the plot conditions shown in FIGS. 11 and 12 may be stored within the plot judging unit 44 or in the local memory 46, for example.

The frame memories 47 and 48 are provided in order to store the final color information. When it is judged that the plotting is to be made as a result of the plot judging process carried out in the plot judging unit 44, pixel information to be plotted is written into the frame memory 47 or 48 from the plot judging unit 44. The video controller 49 reads pixel information from the frame memory 48 (or 47) which is different from the frame memory 47 (or 48) to which the plot judging unit 44 is writing the pixel information, and generates image data (output video signal) VOUT to be displayed on the display 3. When the plotting process amounting to one picture (frame) is completed, the controller 41 generates the image complete signal E, so as to reverse the write/read roles of the frame memories 47 and 48. As a result, it is possible to positively prevent the pixel information during the write process to the frame memory from being output from the plot judging unit 44 as the output video signal VOUT.

Figure 13:
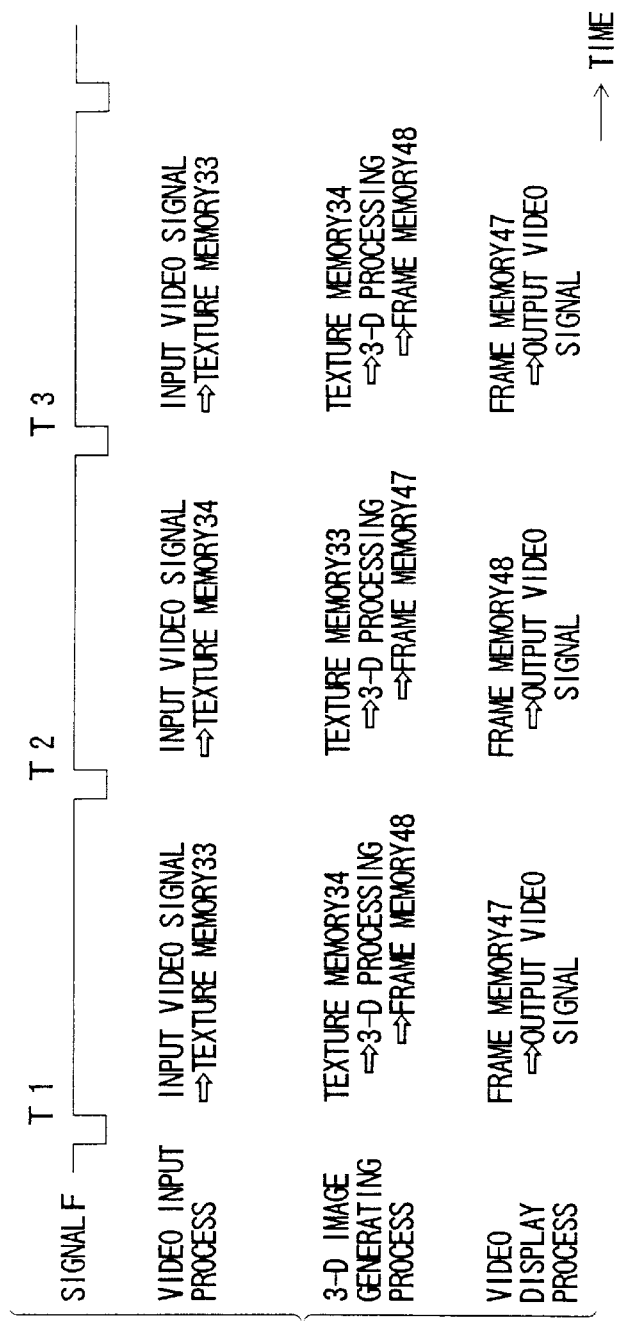
FIG. 13 is a timing chart for explaining the timing relationships of a frame signal, a video signal input process, a three-dimensional image generating process and an output video signal generating process.

The relationship of the input video signal Vi and the output video signal VOUT is only complex to an extent such that the plotting of the three-dimensional object which is described by the three-dimensional image generating process using approximation by the polygons can be completed within 1 frame. Further, if it is assumed that there is only one input video signal Vi, this relationship becomes as shown in FIG. 13. FIG. 13 is a timing chart for explaining the timing relationship of the frame signal F, the video signal input process of the video signal input unit 10, the three-dimensional image generating process of the three-dimensional image generating unit 14, and the output video signal generating process (video display process of the display 3) of the video controller 49.

In FIG. 13, when observed in units of frames, the input video signal Vi at a time T1 is input to the memory 33 of the texture memory unit 15. During this time when the input video signal is input to the memory 33, the three-dimensional image generating unit 14 carries out the three-dimensional image generating process using the video signal which is already input to the memory 34 of the texture memory unit 15. The video signal Vi which is input at the time T1 is subjected to the three-dimensional processing in the three-dimensional image generating unit 14 at a time T2 of the next frame before being written into the frame memory 47. During this time, the video controller 49 generates the output video signal VOUT based on the pixel information that is already store din the frame memory 48, and outputs the output video signal VOUT to the display 3. The input video signal Vi which is input to the memory 33 of the texture memory unit 15 at the time T1 is first read from the frame memory 47 by the video controller 49 at a time T3 of the second next frame. The video controller 49 generates the output video signal VOUT based on the input video signal Vi that is read from the frame memory 47 at the time T3, and outputs this output video signal VOUT to the display 3.

Therefore, according to this embodiment, a time difference (or error) between the input video signal and the output video signal is 3 frames at the minimum. When the time difference between the input video signal and the output video signal is 3 frames, for example, it is possible to subject the video signal to the three-dimensional process with a delay of such a small extent that the delay is not recognizable by the human eyes.

On the other hand, when the three-dimensional object that is described by the polygons using approximation becomes complex, the three-dimensional image generating process is not completed within the time of 1 frame. In this case, a number of frames corresponding to the excess time that is required to complete the three-dimensional image generating process is generated as a delay of the video signal in addition to the minimum delay of 3 frames. In order to avoid such a considerable delay of the video signal, the video controller 49 of this embodiment supplies a stop signal STP to the controller 41 at the time when 1 frame is completed. When this stop signal STP becomes valid during the three-dimensional image generating process, the controller 41 forcibly stops the three-dimensional image generating process and validates the image complete signal E. Further, the controller 41 switches the frame memory from which the video controller 49 reads and the frame memory to which the plot judging unit 44 writes. Consequently, it is possible to limit the delay of the output video signal VOUT to a predetermined value.

Inconveniences which are introduced by stopping the three-dimensional image generating process at a halfway point may be avoided by taking measures so that the displayed image will not become unnatural depending on how the three-dimensional shape is formed. For example, such measures include a technique which first plots main pixels of the picture and thereafter plots information related to the peripheral portion of the picture that will not impede even when eliminated.

Next, a description will be given of a second embodiment of the image information processing apparatus according to the present invention, by referring to FIG. 14. FIG. 14 is a system block diagram showing the general construction of the second embodiment. In FIG. 14, those parts which are the same as those corresponding parts in FIG. 3 are designated by the same reference numerals, and a description thereof will be omitted.

In FIG. 14, The three-dimensional computer graphics generating apparatus 1 shown in FIG. 14 includes a mother board 70 and a daughter board 71. The mother board 70 generally includes an interface controller 701, a controller 702, a three-dimensional image generator 703, a local memory 704, frame memories 705 and 706, and a video encoder 707 which are connected as shown. On the other hand, the daughter board 71 generally includes a video decoder 711, a controller 712, a cross bar switch 713, and texture memories 714 through 716 which are connected as shown. The interface controller 701 is coupled to the host processor 11 via the system bus 12. An output of the video encoder 717 is coupled to the display 3 which is made up of a cathode ray tube (CRT), for example. In addition, the input video signal from the video camera 2 or the like is supplied to the video decoder 711.

A part made up of the three-dimensional image generator 703, the local memory 704, the frame memories 705 and 706, and the video encoder 707 corresponds to the three-dimensional image generating unit 14 shown in FIG. 3. A part made up of the video decoder 711 and the controller 712 corresponds to the video signal input unit 10 shown in FIG. 3. In addition, a part made up of the cross bar switch 713 and the texture memories 714 through 716 corresponds to the texture memory unit 15 shown in FIG. 3.

The interface controller 701 and the controller 702 control the system bus 12. For example, a semiconductor circuit AMCC-S5933 manufactured by AMCC may be used for the interface controller 701, and a semiconductor circuit XC3190A manufactured by Xylyncs may be used for the controller 702. The three-dimensional image generator 703 includes all of the functions except for the control related to the input video signal, and corresponds to a part made up of the controller 41, the DDA 42, the texture processor 43 and the plot judging unit 44 shown in FIG. 9. For example, a semiconductor circuit MB86271 manufactured by Fujitsu Limited may be used for the three-dimensional image generator 703. The local memory 704 corresponds to the local memory 46 shown in FIG. 9, and for example, a SDRAM μPD4516161G5-A12 manufactured by Nippon Electric Co. may be used for the local memory 704. The frame memories 705 and 706 respectively correspond to the frame memories 47 and 48 shown in FIG. 9, and for example, a VRAM μPD482445 manufactured by Nippon Electric Co. may be used for each of the frame memories 705 and 706. The video encoder 707 converts the image information generated in the frame memories 705 and 706 by the three-dimensional image generator 704 into a video signal, and outputs the video signal. The synchronizing signals separated from the input video signal in the video decoder 711 are used when making this conversion of the image information into the video signal, and thus, it is possible to obtain the output video signal which is synchronized to the input video signal. For example, a semiconductor circuit Bt855 manufactured by Brook Tree may be used for the video encoder 707.

For example, a semiconductor circuit Bt812 manufactured by Brook Tree may be used for the video decoder 711. The controller 712 includes the arbitration circuit 31 shown in FIG. 5. For example, a semiconductor circuit XC3190A manufactured by Xylyncs may be used for the controller 712. The cross bar switch 713 corresponds to the cross bar switch circuit 32 shown in FIG. 5. For example, a semiconductor circuit SN74CBT16209 manufactured by Texas Instruments may be used for the cross bar switch 713. The texture memories 714 through 716 correspond to the texture memories 33 and 34 shown in FIG. 5 and the third memory (not shown). In this case, the texture memory 716 is provided as the third memory exclusively for storing the two-dimensional image information to be pasted as patterns on the surfaces of the polygons to be generated by the three-dimensional image generating unit 14. For example, a SRAM TC551664AJ manufactured by Toshiba may be used for each of the texture memories 714 through 716.

According to this embodiment, it is possible to realize an inexpensive image information processing apparatus which can carry out both the real-time processing of the video signal and the free three-dimensional computer graphic process with respect to the video signal, by use of a relatively simple construction utilizing existing semiconductor circuits.

In the embodiments described above, it was described for the sake of convenience that at least two texture memories and two frame memories are provided and that the read/write accesses thereto are switched. However, it is of course possible to use a single memory element such as a dual-port memory, and switch a plurality of memory regions of the dual-port memory to be accessed by the read/write.

In addition, the present invention is basically applicable to any image information processing apparatus which is designed to carry out a texture process using a texture memory. Hence, a description will now be given of an image information processing system which may be applied with the present invention, by referring to FIGS. 15 through 18.

Figure 15:
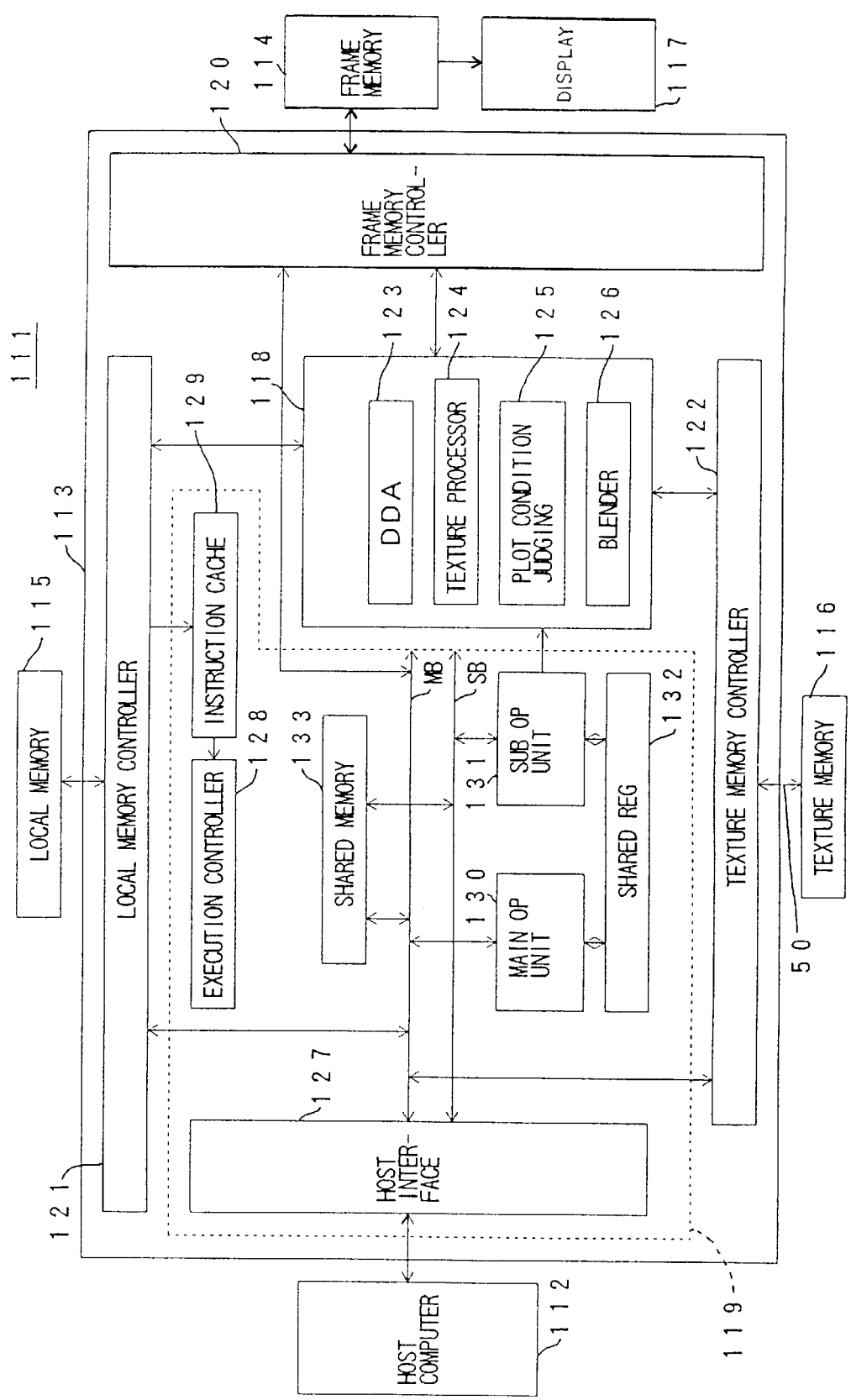
FIG. 15 is a system block diagram showing the construction of an image information processing system to which the present invention may be applied.

FIG. 15 is a system block diagram showing the construction of the image information processing system to which the present invention may be applied. In FIG. 15, an image information processing system 111 converts three-dimensional image data into data that can be displayed on a display unit 117 such as a display, and outputs the converted data. This information processing system 111 includes a host computer 112 which supplies three-dimensional image data and operates as a host system, an information processing unit 113 which processes data from the host computer 112 and develops the data into data of an image to be plotted, a frame memory 114 which stores the image data developed by the information processing unit 113, a local memory 115 which stores processing programs of the information processing unit 113, the three-dimensional image data to be displayed and the like, a texture memory 116 which stores texture data for pasting patterns on surfaces of an object to be displayed, and the display unit 117 which reads and displays the two-dimensional image data store din the frame memory 14.

The host computer 112 decomposes the three-dimensional image data into graphic elements, and after carrying out a geometric conversion, the host computer 112 supplies packet format data to the information processing unit 113.

The information processing unit 113 carries out a predetermined process with respect to the three-dimensional image data supplied from the host computer 112, and creates the image data to be plotted and develops the image data in the frame memory 114. The information processing unit 113 includes a graphic hardware part 118 which processes the supplied image data by an exclusive hardware which is preset internally, a microprogram execution unit 119 which operates in parallel with the graphic hardware part 118 and executes processes depending on the programs, a frame memory controller 120 which controls the write and read of the image data with respect to the frame memory 114 depending on instructions from the graphic hardware part 118 and the microprogram execution unit 119, a local memory controller 121 which controls the write and read of the microprograms and the processed image data with respect to the local memory 115, and a texture memory controller 122 which controls the write and read of the texture data with respect to the texture memory 116.

The frame memory 114 is made up of a video random access memory (VRAM) or the like, and stores each of the color data of red (R), green (G) and blue (B) and an α-value in 8 bits.

The local memory 115 is made up of a SDRAM or the like, and stores the microprograms, the color data of R, G and B, the α-value related to blending, plotting data such as a Z-value related to the depth, and user data.

The texture memory 116 is made up of a SDRAM, SRAM, PROM or the like, and stores the texture data formed by the color data of R, G and B and the α-value.

The data in the texture memory 116 are managed in units of pages for each pattern of the texture data. Hence, the access to the texture memory 116 can be made at a high speed because the reference to the data can be made for each page.

The graphic hardware part 118 is provided exclusively for making a three-dimensional graphic plot. The graphic hardware part 118 includes a linear interpolation unit (DDA) 123 which carries out a process of interpolating each pixel forming the inside of the graphics (polygons) forming the three-dimensional graphics, a texture processor 124 which carries out a process of setting the pattern of the part interpolated by the DDA 123 based on the data within the texture memory 116, a plot condition judging unit 125 which judges whether or not to plot each pixel based on the data that is in units of pixels, and a blender 126 which blends the color value of the pixel to be plotted and the color value of the pixel which is already plotted thereunder. The graphic hardware part 118 can carry out processes independently of the microprogram execution unit 119 by setting the necessary parameters and starting the graphic hardware part 118.

Coordinates (X, Y, Z) of the pixel at the starting point of the interpolation, colors (R, G, B, α), texture coordinates (S, T, Q), a depth queue value (D), incrementing values ($_\Delta$X, $_\Delta$Y, $_\Delta$Z, $_\Delta$R, $_\Delta$G, $_\Delta$B, $_\Delta$α, $_\Delta$S, $_\Delta$T, $_\Delta$Q, $_\Delta$D) of each value to the starting point of the interpolation, and the number of interpolating operations are supplied to the DDA 123. The DDA 123 output an interpolation value by adding an incrementing value to an initial value by the set number of interpolated operations.

The microprogram execution unit 119 carries out the process of analyzing the packet format data supplied from the host computer 112. The microprogram execution unit 119 includes a host interface 127, an execution controller 128, an instruction cache 129, a main operation unit 130, a sub operation unit 131, a shared register 132 and a shared memory 133 which are connected as shown in FIG. 15. The host interface 127 carries out a process of analyzing the packet format data supplied from the host computer 112, and also controls the access to the frame memory 114, the local memory 115 and the texture memory 116. The execution controller 128 controls the entire information processing unit 113 based on the programs stored in the local memory 115. The instruction cache 129 temporarily stores instruction blocks which are analyzed and executed by the execution controller 128. The main operation unit 130 carries out various operations depending on the instructions from the execution controller 128. The sub operation unit 131 carries out various operations depending on the instructions from the execution controller 128 in parallel with the main operation unit 130. The data read and data write can be carried out with respect to the shared register 132 and the shared memory 133 in parallel from the main operation unit 130 and the sub operation unit 131.

The host interface 127 includes a buffer (not shown) which temporarily stores the data of the polygons which are to be plotted, and the data are successively read from the host interface 127.

The main operation unit 130 includes a program execution control function, and the sub operation unit 131 includes a function of controlling the graphic hardware part 118. In addition, the main operation unit 130 and the sub operation unit 131 operate in synchronism with each other in response to a parallel instruction code.

The microprogram execution unit 119 is designed to cope with RISC type instruction sets corresponding to various processes by combining basic instructions, in order to control the processes by the microprograms.

The frame memory controller 120 is coupled to the frame memory 114, the graphic hardware part 118, and a main bus MB of the microprogram execution unit 119. The frame memory controller 120 controls the writing of the image data from the graphic hardware part 118 and the microprogram execution unit 119 to the frame memory 114 and the reading of the image data from the frame memory 114 to the graphic hardware part 118 and the microprogram execution unit 119 depending on requests from the graphic hardware part 118 and the microprogram execution unit 119.

The frame memory controller 120 improves the access speed to the frame memory 114 by making the access to the frame memory 114 exclusively a write access when plotting the three-dimensional image.

The local memory controller 121 is coupled to the local memory 115, the graphic hardware part 118 and the microprogram execution unit 119. The local memory controller 121 controls the writing of the microprograms and various data such as the color data (R, G, B, α), Z-value and window ID from the graphic hardware part 118 and the microprogram execution unit 119 to the local memory 115. The local memory controller 121 also controls the reading of the various data from the local memory 115 to the graphic hardware part 118 and the microprogram execution unit 119.

The local memory controller 121 copies texture type data such as (Z, S, T, Q, D) to the local memory 115 in addition to the color type data (R, G, B, α) when plotting the three-dimensional image. For this reason, it is unnecessary to store the texture type data in the frame memory 114, thereby making it possible to improve the access speed to the frame memory 114 and realize a high-speed processing.

The texture memory controller 122 is coupled to the texture memory 116, the graphic hardware part 118 and the microprogram execution unit 119. The texture memory controller 122 controls the reading of the texture data from the texture memory 116 to the graphic hardware part 118 and the microprogram execution unit 119 in response to requests from the graphic hardware part 118 and the microprogram execution unit 119. In addition, the texture memory controller 122 controls the writing of the texture data from the microprogram execution unit 119 to the texture memory 122 in response to a request from the microprogram execution unit 119.

By the provision of the frame memory controller 120, the local memory controller 121 and the texture memory controller 122, the graphic hardware part 118 and the microprogram execution unit 119 can make access to the frame memory 114, the local memory 115 and the texture memory 116. As a result, no memory access contention occurs, and it is possible to efficiently carry out the data processing since no wait time is introduced during the data processing.

The execution controller 128 controls the execution of an instruction fetch (F), an instruction analysis (D), a data read (R) and an operation execution/data store (E) in this order.

The execution controller 128 includes 3 field instruction systems for controlling the processes of the main operation unit 130, the sub operation unit 131 and the graphic hardware part 118, so that the processes can be controlled independently.

The display unit 117 displays the image based on the color type data (R, G, B, α) stored in the frame memory 114.

FIG. 16 is a flow chart for explaining the general operation of the image information processing system 111 described above when carrying out an information processing.

The information processing unit 113 of this embodiment first carries out an initializing process in a step S1-1 when carrying out the information processing.

Next, the existence of an unprocessed packet is judged, and a data processing corresponding to the packet is carried out if an unprocessed packet exists. More particularly, a step S1-2 decides whether or not an unprocessed packet exists, and a step S1-3 carries out a data processing corresponding to the packet if the decision result i the step S1-2 becomes YES.

When the data processing corresponding to the packet ends, a step S1-4 decides whether or not the data processing with respect to the unprocessed packet is completed. If an unprocessed packet still exists and the decision result in the step S1-4 is NO, the process returns to the step S1-3. On the other hand, if the decision result in the step S1-4 is YES, the process returns to the step S1-2 and the process waits until the next packet is supplied.

Therefore, the information processing unit 113 receives the processing data from the host computer 12 in the packet format, and carries out the processing for each packet.

Next, a more detailed description will be given of the process of plotting the three-dimensional graphics information.

Figure 17:
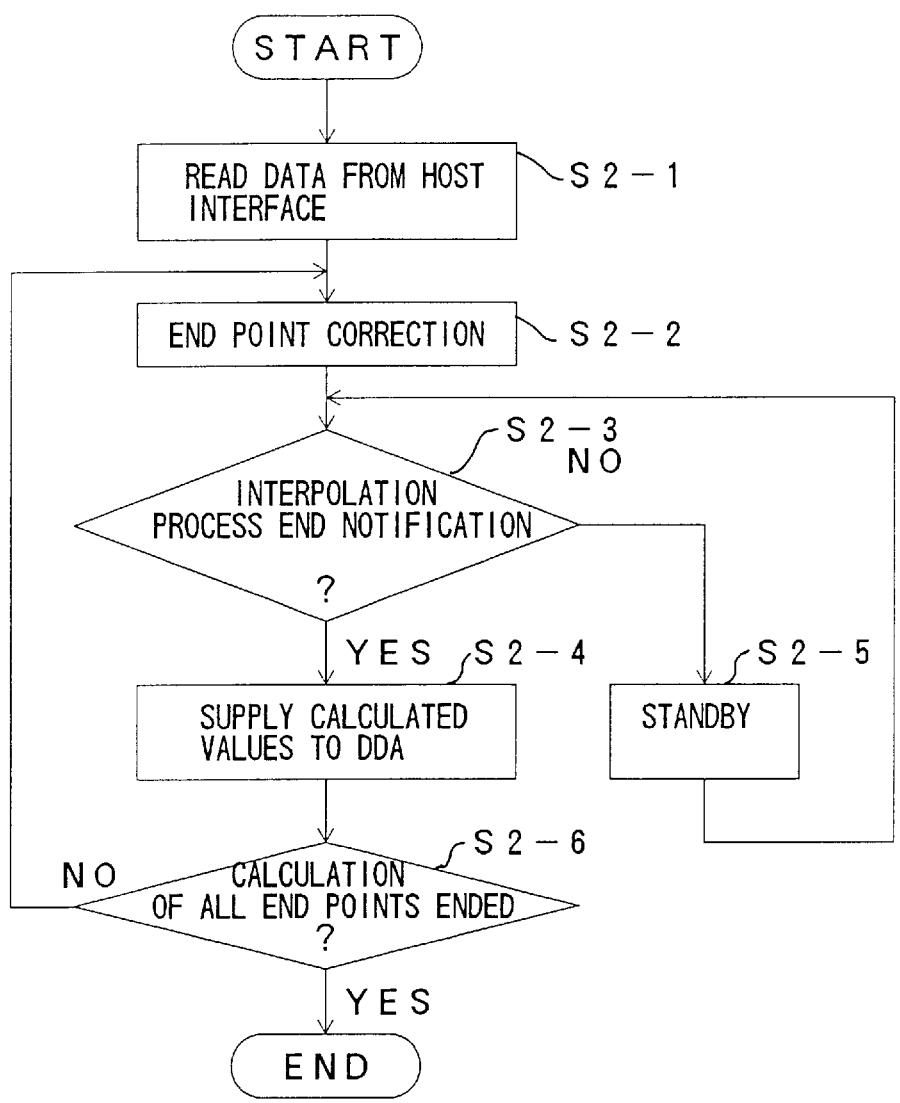
FIG. 17 is a flow chart for explaining the operation of a microprogram execution unit when carrying out a rasterizing process in the image information processing system.

FIG. 17 is a flow chart for explaining the operation of the microprogram execution unit 119 when carrying out a rasterizing process in the image information processing system 111.

First, in a step S2-1 shown in FIG. 17, the microprogram execution unit 119 reads from the host interface 127 the coordinates (X, Y, Z) of the vertexes of the polygons which are required to plot the image, the color values (R, G, B, a), the texture coordinates (S, T, Q), the initial values (X, Y, Z, R, G, B, $\alpha$, D, S, T, Q) made up of the depth queue value (D), and the incremental values (dX, Dy, dZ, dR, dG, dB, d$\alpha$, dD, dS, dT, dQ) of each of the values between the vertexes.

Next, in a step S2-2, an end point forming a side between the vertexes of the polygon is calculated. As will be described later, the side of the polygon and the pixel do not necessarily match. Hence, the step S2-2 also carries out a correction calculation with respect to the end point in the DDA 123 of the graphic hardware part 118 in order to accurately plot the polygon.

In a step S2-3, a decision is made to determine whether or not an interpolation process end notification which indicates the end of an interpolation process with respect to one end point is received from the graphic hardware part 118. If the decision result in the step S2-3 is YES, the microprogram execution unit 119 in a step S2-4 supplies the values (X, Y, Z, R, G, B, $\alpha$, D, S, T, Q) of the end point which is already calculated in the step S1-2 to the DDA 123 of the graphic hardware part 118 for carrying out a linear interpolation process. On the other hand, if the decision result in the step S2-3 is NO, the microprogram execution unit 119 in a step S2-5 does not carry out the next process but assumes a standby state as shown in FIG. 17.

In a step S2-6, a decision is made to determine whether or not the calculation of all of the end points is ended, and the process returns to the step S2-2 if the decision result in the step S2-6 is NO. As a result, the steps S2-2 through S2-5 are repeated until one polygon is formed.

Figure 18:
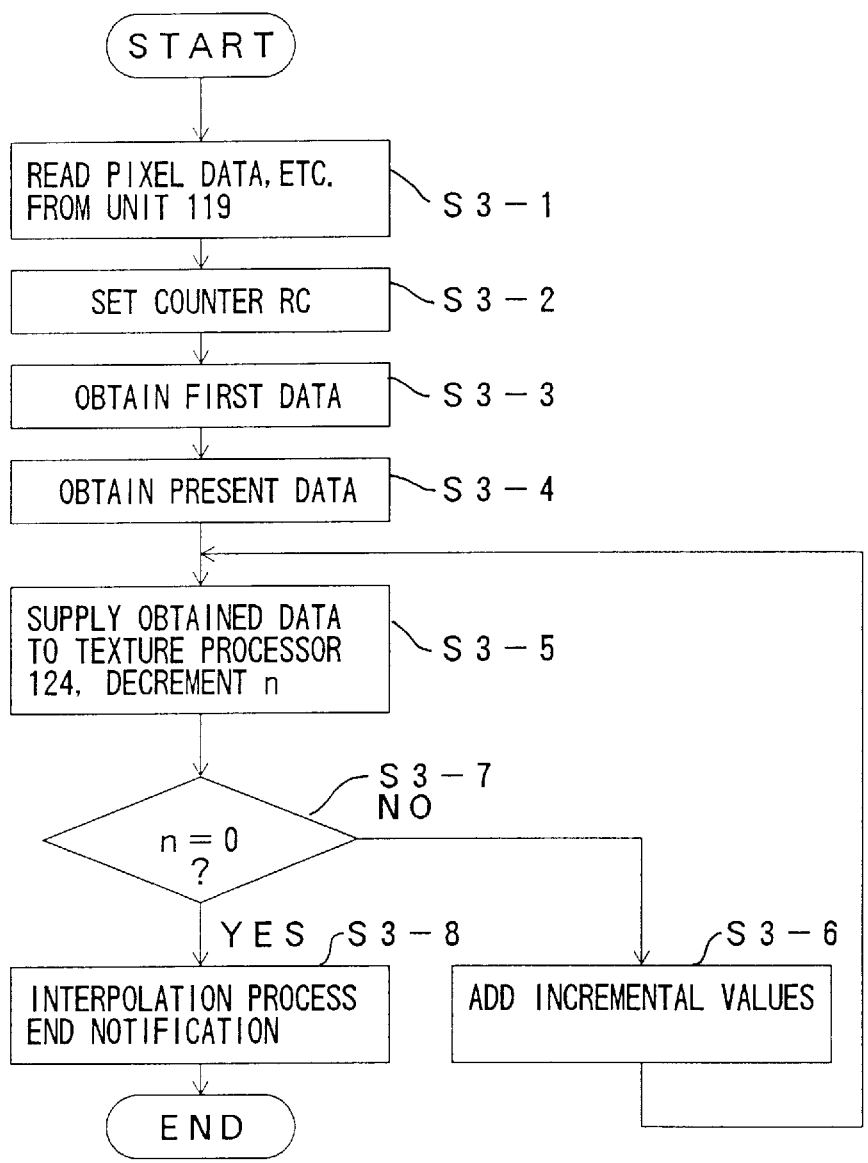
FIG. 18 is a flow chart for explaining the operation of a linear interpolation processing unit of a graphic hardware part exclusively for the graphic process when carrying out the rasterizing process in the image information processing system.

FIG. 18 is a flow chart for explaining the operation of the DDA 123 of the graphic hardware part 118 when carrying out the rasterizing process in the image information processing system 111.

First, in a step S3-1 shown in FIG. 18, the graphic hardware part 118 reads from the microprogram execution unit 119 the values (X, Y, Z, R, G, B, $\alpha$, D, S, T, Q) of the calculated end points, a number n of interpolation processes required to interpolate one line, and the incremental values (dX, dY, dZ, dR, dG, dB, $\alpha$, dD, dS, dT, dQ) of the values (X, Y, Z, R, G, B, $\alpha$, D, S, T, Q) between the adjacent pixels.

Next, in a step S3-2, the number n of interpolation processes read by the graphic hardware part 118 is set in a repeat counter (RC) which is provided within the graphic hardware part 118.

In a step S3-3, the graphic hardware part 118 supplies the values ($X_0$, $Y_0$, $Z_0$, $R_0$, $G_0$, $B_0$, $\alpha_0$, $D_0$, $S_0$, $T_0$, $Q_0$) of the end points read from the microprogram execution unit 119 to the texture processor 124 as the first data in the DDA 123.

In a step S3-4, the DDA 123 of the graphic hardware part 118 regards values ($X_0$+1, $Y_0$, $Z_0$+dZ, $R_0$+dR, $G_0$+dG, $B_0$+dB, $\alpha_0$+d$\alpha$, $D_0$+dD, $S_0$+dS, $T_0$+dT, $Q_0$+dQ) as the values of the present pixel, where the values (($X_0$+1, $Y_0$, $Z_0$+dZ, $R_0$+dR, $G_0$+dG, $B_0$+dB, $\alpha_0$+d$\alpha$, $D_0$+dD, $S_0$+dS, $T_0$+dT, $Q_0$+dQ) are obtained by adding the incremental values (dZ(=1), dY(=0), dZ, dR, dG, dB, d$u$, dD, dS, dT, dQ) read in the step S2-1 to the first values ($X_0$+1, $Y_0$, $Z_0$+dZ, $R_0$+dR, $G_0$+dG, $B_0$+dB, $\alpha_0$+d$\alpha$, $D_0$+dD, $S_0$+dS, $T_0$+dT, $Q_0$+dQ).

Then, in a step S3-5, the obtained values ($X_0$+1, $Y_0$, $Z_0$+dZ, $R_0$+dR, $G_0$+dG, $B_0$+dB, $\alpha_0$+d$\alpha$, $D_0$+dD, $S_0$+dS, $T_0$+dT, $Q_0$+dQ) of the present pixel are supplied to the texture processor 124, and the repeat counter RC is started. In addition, the step S3-5 subtracts 1 from the number n of interpolation processes that is set, so as to set the number of interpolation processes to (n−1).

In a step S3-6, the graphic hardware part 118 adds the incremental values (1, 0, dZ, dR, dG, dB, d$\alpha$, dD, dS, dT, dQ) to the previous pixel values ($Xn_{-1}$, $Yn_{-1}$, $Zn_{-1}$, $Rn_{-1}$, $Gn_{-1}$, $Bn_{-1}$, $\alpha n_{-1}$, $Dn_{-1}$, $Sn_{-1}$, $Sn_{-1}$, $Tn_{-1}$, $Qn_{-1}$), and regards the obtained values as the present pixel values. In addition, the step S3-6 supplies the obtained present pixel values to the texture processor 124, and subtracts 1 from the number n of interpolation processes.

The above described steps S3-5 and S3-6 are repeated until the value of the repeat counter RC becomes 0. The interpolation process end notification is made to the microprogram execution unit 119 when the value of the repeat counter RC becomes 0. More particularly, a step S3-7 decides whether or not the set number of processes is 0. If the decision result in the step S3-7 is YES, a step S3-8 makes the interpolation process end notification to the microprogram execution unit 119, and the process ends. On the other hand, if the decision result in the step S3-7 is NO, a step S3-6 adds the incremental values to the previous data and regards the obtained values as the present data, and the process returns to the step S3-5. Hence, it is possible to carry out the interpolation with respect to the data within the polygon by simply repeating a predetermined interpolation process with respect to the end points a set number of times. For this reason, the interpolation process itself is simplified, and the interpolation process can be realized by a simple pipeline processing.

FIG. 19 is a system block diagram showing the general construction of the graphic hardware part 118 together with characterizing parts of the present invention. In FIG. 19, the illustration of the microprogram execution unit 119, the frame memory controller 120, the local memory controller 121 and the texture memory controller 122 is omitted for the sake of convenience. Further, in FIG. 19, those parts which are the same as those corresponding parts in FIGS. 3, 9 and 15 are designated by the same reference numerals, and a description thereof will be omitted.

As shown in FIG. 19, a texture memory unit 15-1 has the same construction as the texture memory unit 15 shown in FIG. 5 except for the texture memory 116 which is excluded from the texture memory unit 15-1. The texture memory 116 corresponds to the memories 33 and 44 shown in FIG. 5 and the third memory (not shown), and thus, the texture memory unit 15-1 is generally made up of the arbitration circuit 31 and the cross bar switch circuit 32 shown in FIG. 5. The texture memory 116 and the texture memory unit 15-1 are respectively coupled to the texture processor 124 via the texture bus 50.

The input video signal which is supplied to the video signal input unit 10 is not limited to the video signal output from the video camera 2. For example, the input video signal may be a video signal output from a video tape recorder (VTR).

Further, the present invention is not limited to these embodiments, but various variations and modifications may be made without departing from the scope of the present invention.

What is claimed is:

1. An image information processing apparatus comprising:
    a cross bar switch circuit receiving first image information which indicates a two-dimensional image and second image information which indicates three-dimensional computer graphics describing a three-dimensional object by approximation using a plurality of polygons;
    an arbitration circuit controlling a connection of said cross bar switch circuit according to a predetermined rule based on a synchronizing signal which is related to said first image information; and
    memory means having a first memory region and a second memory region which is different from said first memory region, each of said first memory region and said second memory region storing information amounting to at least one frame,
    said memory means being capable of reading information from said second memory region during a time in which image information output from said cross bar switch circuit is written in said first memory region.

2. The image information processing apparatus as claimed in claim 1, which further comprises:
    three-dimensional image information generating means for generating the second image information which indicates the three-dimensional computer graphics,
    said three-dimensional image information generating means reading the image information stored in said second memory region of said memory means and outputting an output video signal by carrying out a three-dimensional process with respect to the read image information.

3. The image information processing apparatus as claimed in claim 2, wherein said three-dimensional image information generating means generates the second image information by reading from a third memory region of said memory means image information which is related to patterns to be pasted on surfaces of polygons.

4. The image information processing apparatus as claimed in claim 3, wherein said memory means comprises:
    a first memory including said first memory region;
    a second memory including said second memory region, said second memory being independent of said first memory; and
    a third memory including said third memory region, said third memory being independent of said first and second memories.

5. The image information processing apparatus as claimed in claim 2, wherein said three-dimensional image information generating means comprises:
    a linear interpolation processor analyzing coordinates of polygons input from outside and calculating coordinates and color values for the polygons which are decomposed in units of 1 pixel;
    a texture processor making an access to said third memory region of said memory means and calculating color values of the patterns to be pasted on the surfaces of the polygons;
    frame memory means for storing final color information;
    a plot judging unit judging whether or not to plot to said frame memory means based on depth information and color information of each pixel; and
    a video controller generating the output video signal based on the color information read from said frame memory means.

6. The image information processing apparatus as claimed in claim 5, wherein said plot judging unit has a plurality of color judging modes which are set in advance, and extracts pixels of a predetermined color by determining plotting conditions depending on the color judging mode.

7. The image information processing apparatus as claimed in claim 2, which further comprises:
    means for maintaining a delay time of the output video signal output from said three-dimensional image information generating means with respect to the input video signal supplied to said video signal input means to a predetermined time.

8. The image information processing apparatus as claimed in claim 1, which further comprises:
    video signal input means for generating said first image information based on an input video signal indicative of the two-dimensional image.

9. The image information processing apparatus as claimed in claim 8, wherein said video signal input means comprises:
    a selector selectively outputting one of a plurality of input video signals based on a signal obtained from said arbitration circuit.

10. The image information processing apparatus as claimed in claim 9, wherein at least one of said input video signals is obtained from an output of a video camera.

11. The image information processing apparatus as claimed in claim 8, wherein said input video signal is obtained from an output of a video camera.

12. The image information processing apparatus as claimed in claim 1, wherein said memory means comprises:
    a first memory including said first memory region; and
    a second memory including said second memory region, said second memory being independent of said first memory.

13. The image information processing apparatus as claimed in claim 1, wherein said arbitration circuit controls the connection of said cross bar switch circuit according to the predetermined rule so as to prohibit switching of the connection until information amounting to one frame is written to or read from one of said first and second memory regions.

14. The image information processing apparatus as claimed in claim 1, which further comprises:
    video signal input means for generating said first image information based on an input video signal indicative of the two-dimensional image and for outputting a frame signal; and
    three-dimensional image information generating means for generating the second image information which indicates the three-dimensional computer graphics and for outputting an image complete signal,
    said arbitration circuit having a plurality of mutually different states for controlling the connection of said cross bar switch circuit, and assuming one of said states depending on the frame signal and the image complete signal.

15. The image information processing apparatus as claimed in claim 14, wherein said states of said arbitration circuit also determine valid and invalid states of a write signal which is received from said video signal input means and a timing synchronizing signal which is output to said video signal input means.

* * * * *

UNITED STATES PATENT AND TRADEMARK OFFICE
CERTIFICATE OF CORRECTION

PATENT NO.: 5,835,101
DATED : November 10, 1998
INVENTOR(S): Tatsushi OTSUKA

It is certified that error appears in the above-identified patent and that said Letters Patent is hereby corrected as shown below:

Col. 17, line 16, change " a), " to --a),--;
line 55, change "$\alpha$" to --d$\alpha$--.

Col. 18, line 5, change "d$\mu$" to --d$\alpha$--.

Signed and Sealed this

Fourth Day of May, 1999

Q. TODD DICKINSON

Attest:

Attesting Officer

Acting Commissioner of Patents and Trademarks